United States Patent [19]

Arata

[11] Patent Number: 4,875,113
[45] Date of Patent: Oct. 17, 1989

[54] AUTOMATIC STOPPING DEVICE FOR A TAPE FEEDING APPARATUS

[75] Inventor: Tadao Arata, Inagi, Japan

[73] Assignee: Tanashin Denki Co., Ltd., Tokyo, Japan

[21] Appl. No.: 138,915

[22] Filed: Dec. 28, 1987

[30] Foreign Application Priority Data

Aug. 14, 1987 [JP] Japan .................. 62-124345
Aug. 14, 1987 [JP] Japan .................. 62-124346

[51] Int. Cl.$^4$ .................. G11B 15/48; G11B 15/22; B65H 59/38
[52] U.S. Cl. .................. 360/74.2; 360/96.3; 360/74.1; 242/191; 242/186
[58] Field of Search .................. 360/74.1, 74.2, 90, 360/93, 96.1, 96.3, 137; 242/190, 191, 189, 186

[56] References Cited

U.S. PATENT DOCUMENTS

| 4,170,789 | 10/1979 | Inoue .................. | 360/137 |
| 4,495,534 | 1/1985 | Kurafuji .................. | 360/74.2 |
| 4,646,174 | 2/1987 | Hayashi et al. .................. | 360/74.2 |

FOREIGN PATENT DOCUMENTS 61-224162 10/1986 Japan .................. 360/74.2

Primary Examiner—John H. Wolff
Assistant Examiner—Matthew Bussan
Attorney, Agent, or Firm—Wegner & Bretschneider

[57] ABSTRACT

An automatic stopping device for a tape feeding apparatus which can assuredly detect that a tape is wound to its last end and can stop feeding of the tape not only in a reproduction mode but also in a fast feeding mode of the tape feeding apparatus. Stopping of rotation of a reel shaft is detected by a frictionally cooperating cam follower which is thereupon disengaged from a circular cam and engaged with an operating element both on a turning force transmitting member to pivot a pivotal member so that the turning force transmitting member on the pivotal member is moved out of a turning force transmitting route from a capstan shaft to the reel shaft and a switch is operated to deenergize a motor connected to the capstan shaft. After stopping of the motor, a movable member may be manually moved to a rest mode position in which the cam follower is engaged with the circular cam again. The movable member is arrested at the rest mode position until a tape cassette is subsequently loaded in position in the tape feeding apparatus.

19 Claims, 23 Drawing Sheets

F I G. 36
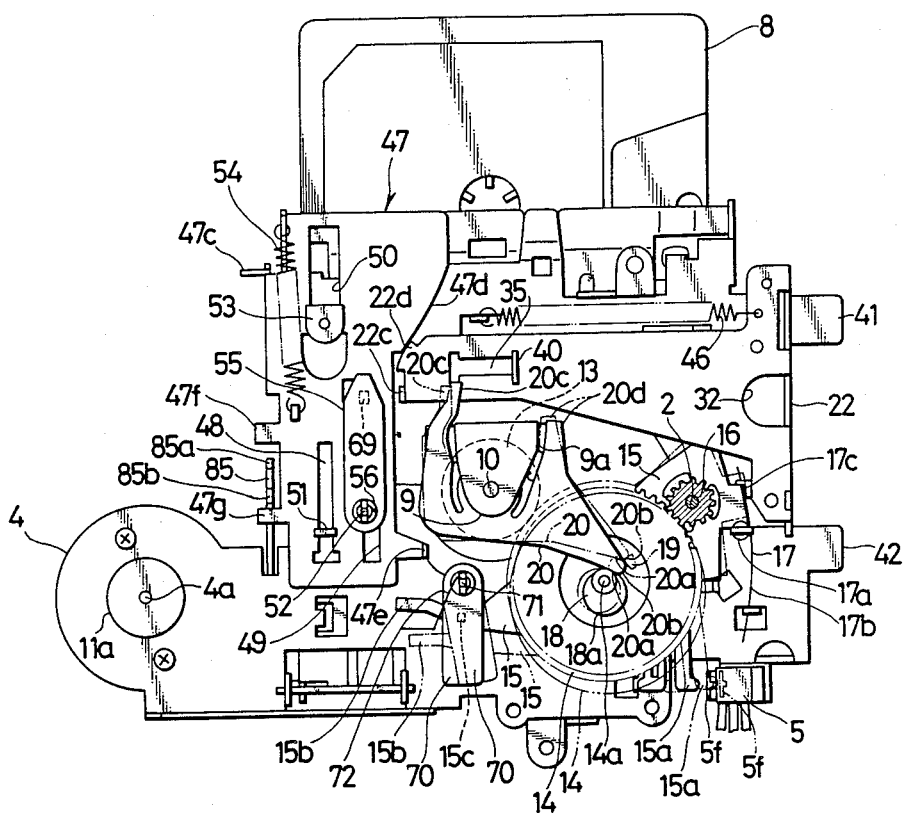

AUTOMATIC STOPPING DEVICE FOR A TAPE FEEDING APPARATUS

BACKGROUND OF THE INVENTION

1. Field of the Invention

This invention relates to an automatic stopping device for a tape feeding apparatus for use with a tape recorder and the like.

2. Description of the Prior Art

An automatic stopping device for a tape feeding apparatus is already known which includes a capstan shaft, a reel shaft, a motor for normally rotating the capstan shaft and the reel shaft, and a switch operable upon stopping of rotation of the reel shaft for interrupting energization of the motor to stop rotation of the capstan shaft.

In such a conventional automatic stopping device for a tape feeding apparatus, the last end of a tape is detected by a detecting element which is urged to an operative position within a tape cassette in which it bends the path of a tape so that the tape may run along the bent path but is displaced from the operative position against the urging force by the tape when the tape is straightened by a tensile force of the tape exerted by a pinch roller and a capstan at the last end of the tape. In this manner, the detecting element mechanically detects the last end of the tape by its displacement from the operative position by the tape being straightened at the last end of the tape. Such a displacement of the detecting element is transmitted as a mechanical detection signal to turn a switch off to interrupt energization of a motor of the tape feeding apparatus. Then, after turning off of the switch, it is kept off by frictional forces of the motor, capstan shaft, pinch roller and so on.

Accordingly, the automatic stopping device operates regularly in a reproduction mode of the tape feeding apparatus in which the tensile force is continuously applied to the tape by the capstan against which the tape is pressed by the pinch roller. However, when the tape feeding apparatus is in a fast feeding mode, the automatic stopping device does not operate because the pinch roller is at a position spaced away from the pinch roller so that a tensile force sufficient to straighten the bent tape path against the urging force applied upon the detecting element is not applied to the tape at the last end of the tape. Consequently, in the fast feeding mode of the tape feeding apparatus, it is impossible to detect whether or not the tape is wound to its last end, and accordingly it is impossible to automatically stop feeding of the tape.

Further, if the motor, capstan shaft, pinch roller and so on are acted upon by vibrations or an impact, the frictional forces thereof may be decreased enough to cause the switch to be turned on. Therefore, the off position of the switch cannot be kept stably.

Besides, since the tape is fed along the bent path due to the detecting piece inserted in the tape cassette, the tape may be displaced in a widthwise direction by the detecting piece, which makes separation and prevention of crosstalk unstable.

In addition, if the tensile force of the tape is not sufficiently strong, then the switch will not be turned off. To eliminate this, the pressing force of the pinch roller against the capstan shaft may be increased to a sufficient level. However, this makes it necessary to exert a high operating force to move the pinch roller away from the capstan shaft.

SUMMARY OF THE INVENTION

Accordingly, it is an object of the present invention to provide an automatic stopping device for a tape feeding apparatus which can assuredly detect whether or not a tape is wound to its last end and can stop feeding of the tape by the tape feeding apparatus not only in a reproduction mode but also in a fast feeding mode of the tape feeding apparatus.

It is another object of the present invention to provide an automatic stopping device for a tape feeding apparatus wherein a switch is kept stably at an off position and separation and prevention of crosstalk can be stabilized and which requires a relatively low force to operate it.

In order to attain the object, according to the present invention, there is provided an automatic stopping device for a tape feeding apparatus which includes a capstan shaft, a reel shaft, a motor for normally rotating the capstan shaft and the reel shaft, and a switch for interrupting energization of the motor to stop rotation of the capstan shaft and the reel shaft, comprising a turning force transmitting member connected to the motor via the capstan shaft, a pivotal member supporting the turning force transmitting member for rotation thereon and mounted for pivotal motion between an operative position in which transmission of a turning force from the turning force transmitting member to the reel shaft is enabled and an inoperative position in which transmission of a turning force is disabled, the switch being located for operation by the pivotal member so as to deenergize the motor in response to the inoperative position of the pivotal member, means for biasing the pivotal member toward the operative position, frictional coupling means interposed between the turning force transmitting member and the reel shaft, detecting means for detecting stopping of rotation of the reel shaft, operating means on the turning force transmitting member operable when the detecting means detects stopping of rotation of the reel shaft for cooperating with the detecting member to pivot the pivotal member from the operative to the inoperative position, and a movable member mounted for movement between an operative mode position and a rest mode position and operable upon movement thereof from the operative mode position to the rest mode position after stopping of the motor for disabling cooperation between the detecting means and the cooperating means.

While the reel shaft is rotating, the automatic stopping device does not operate. But when rotation of the reel shaft is stopped, for example, at the last end of a tape being fed, the detecting means detects such stopping of the reel shaft and consequently the cooperating means pivots the pivotal member from the operative position to the inoperative position whereupon the switch is operated by the pivotal member to stop energization of the motor and the turning force transmitting member is removed from a turning force transmitting route from the capstan shaft to the reel shaft. Then, when the movable member is moved to the operative mode position to the rest mode position after stopping of the motor, the detecting means is restored to a condition in which it can detect stopping of rotation of the reel shaft.

With the automatic stopping device for a tape feeding apparatus of the present invention, whether or not a tape is wound up to the last end thereof can be detected assuredly whether the tape feeding apparatus is in a reproducing mode or in a fast feeding mode. Accordingly, in any of the reproducing mode and the fast feeding mode of the tape feeding apparatus, feeding of the tape can be automatically stopped with certainty.

The above and other objects, features and advantages of the present invention will become apparent from the following description and the appended claims, taken in conjunction with the accompanying drawing.

BRIEF DESCRIPTION OF THE DRAWINGS

FIG. 36 is a bottom plan view, partly broken, of the cassette tape recording mechanism of FIG. 1 when feeding of a tape is to be automatically stopped;

DESCRIPTION OF THE PREFERRED EMBODIMENT

Figure 1:
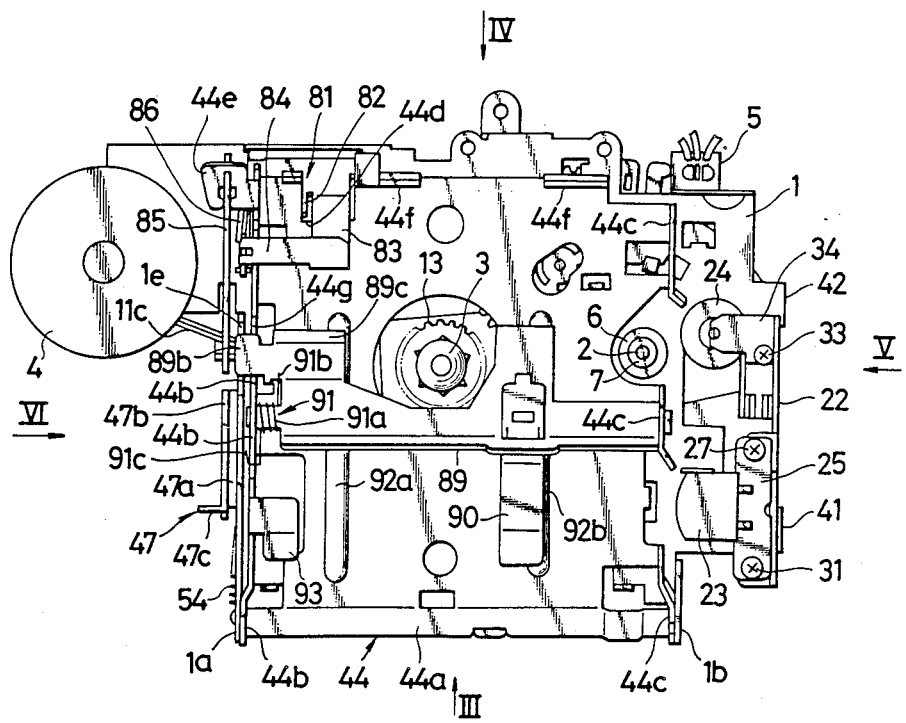
FIG. 1 is a top plan view of a mechanism of a cassette tape recorder in which an automatic stopping device for a tape feeding apparatus according to the present invention is incorporated.

Referring first to FIGS. 1 to 6, there is shown a mechanism of a cassette tape recorder in which an automatic stopping device for a tape feeding apparatus is incorporated. The cassette tape recorder mechanism shown includes a capstan shaft 2, a reel shaft 3, a motor 4 for driving the capstan shaft 2 and the reel shaft 3 to rotate, and a switch 5 for interrupting energization of the motor 4, all located on a chassis 1.

Figure 18:
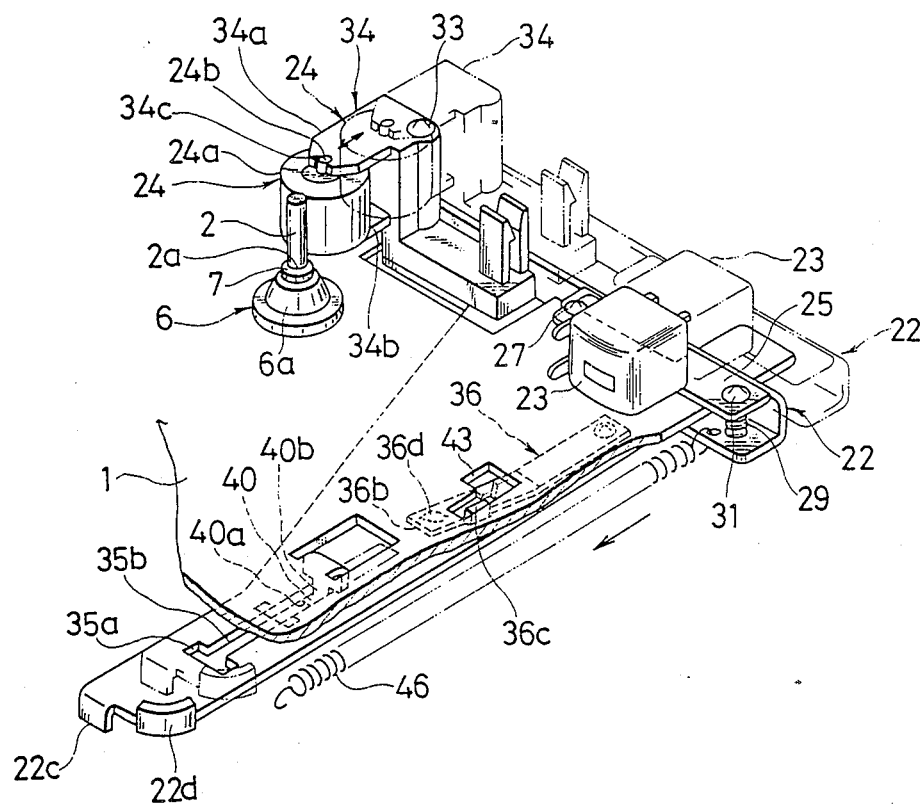
FIG. 18 is a perspective view, partly broken, of the head mounting plate assembled to the chassis.
Figure 32:
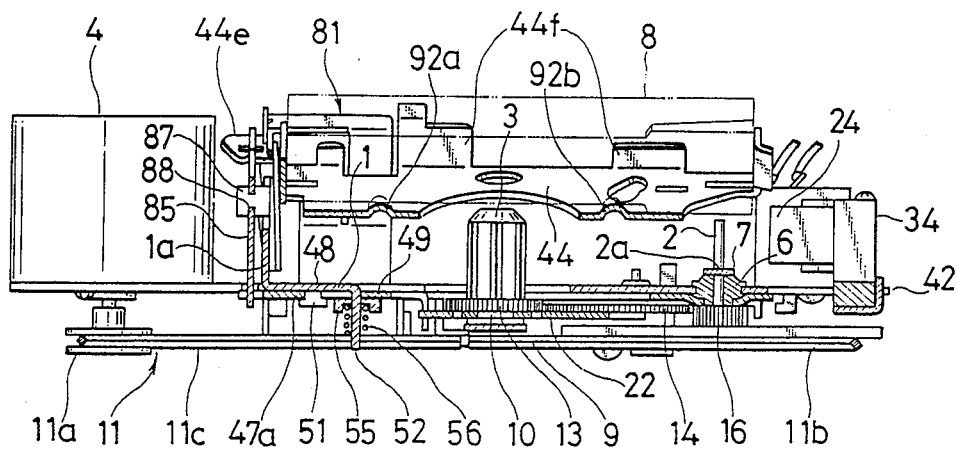
FIG. 32 is a cross sectional view taken along line XXXII—XXXII of FIG. 31.

Referring also to FIGS. 18 and 32, the capstan shaft 2 is fitted from the lower face side of the chassis 1 into and supported for relative rotation on a hub member 6 secured to a predetermined location of the chassis 1 and extends upwardly above an upper face of the chassis 1. A snap ring 7 such as an E-snap ring is snapped into an annular groove 2a formed around an outer periphery of the capstan shaft 2 and is located for engagement with an upper end face of the hub member 6 to prevent the capstan shaft 2 from being inadvertently pulled downwardly off the hub member 6.

Figure 19:
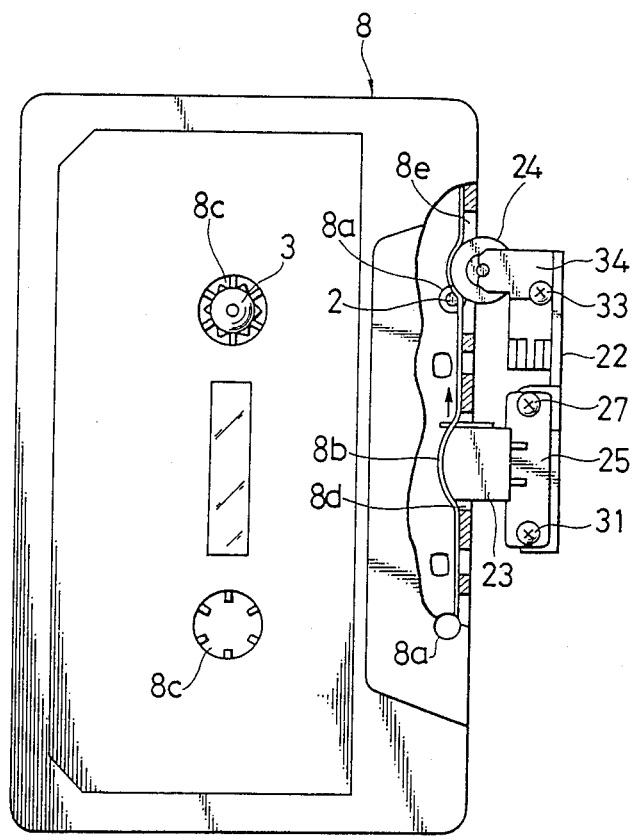
FIG. 19 is a top plan view, partly broken, of a tape cassette in a loaded position in which a magnetic head and a pinch roller of the cassette tape recorder mechanism of FIG. 1 are contacted with a tape in the tape cassette.

The hub member 6 has a guide portion 6a of a truncated right circular conical shape adjacent an upper end thereof. Thus, when a tape cassette 8 is moved to a loaded position as shown in FIG. 19, the guide portion 6a of the hub member 6 is fitted into one of a pair of capstan shaft fitting holes 8a formed in the tape cassette 8, and thereupon it provides an automatic aligning action to the tape cassette 8. Consequently, a guide pin which is conventionally provided specially for providing an automatic aligning action can be eliminated.

Figure 8:
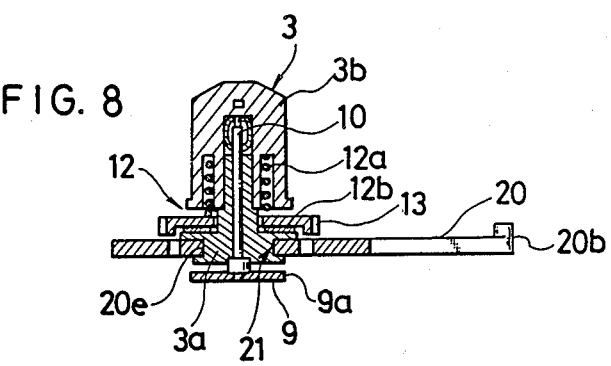
FIG. 8 is a cross sectional view of a reel shaft of the cassette tape recorder mechanism of FIG. 1.
Figure 9:
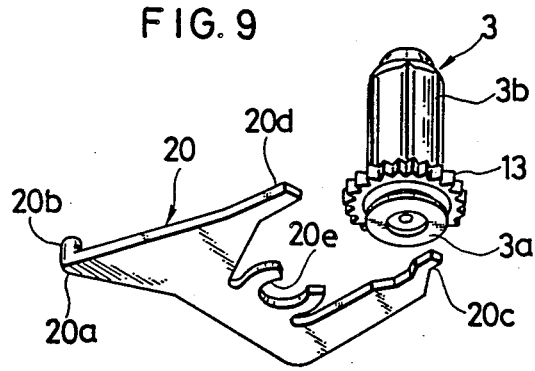
FIG. 9 is a fragmentary perspective view of the reel shaft of FIG. 8.

Referring now to FIGS. 8 and 9, the reel shaft 3 includes a first member 3a supported for rotation on a support shaft 10 secured to and extending upwardly from a support plate 9 formed by slitting of the chassis 1, and a second member 3b fitted for integral rotation on an outer periphery of the first member 3a.

Referring back to FIGS. 1 to 6, the motor 4 is electrically connected to a suitable power source not shown via the switch 5. Turning power of the motor 4 is transmitted to the capstan shaft 2 by way of a power transmitting mechanism 11.

The power transmitting mechanism 11 includes a first pulley 11a securely mounted on an output power shaft 4a of the motor 4, a second pulley 11b of a greater diameter securely mounted at a lower end of the capstan shaft 2, and an endless belt 11c made of a rubber material or the like and extending between and around the first and second pulleys 11a, 11b.

Figure 7:
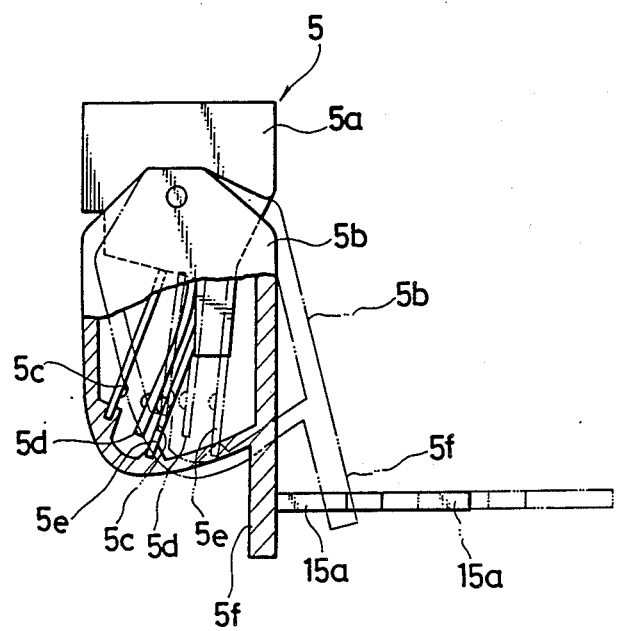
FIG. 7 is an enlarged view, partly broken, of a switch of the cassette tape recorder mechanism of FIG. 1.

Referring to FIG. 7, the switch 5 is of the normally closed type and includes a base member 5a and a cover member 5b supported at an upper end portion thereof for pivotal motion on the base member 5a. First, second and third contact springs 5c, 5d and 5e are secured at upper ends thereof to the base member 5a of the switch 5 such that they may be brought into or out of contact with each other. The first to third contact springs 5c to 5e are located inside the cover member 5b. The first contact spring 5c is located in an opposing relationship to the third contact spring 5e with the second contact spring 5d interposed therebetween, and lower ends of the oppositely located first and third contact springs 5c and 5e are secured to respective predetermined locations of an inner face of the cover member 5b. A tongue 5f is formed at and extends downwardly from a lower end of a side of the cover member 5b. The cover member 5b of the switch 5 is normally biased in a counterclockwise direction in FIG. 7 by spring forces of the first and third contact springs 5c and 5e so that the switch 5 is biased to and normally assumes a position as shown in phantom in FIG. 7 in which the first and second contact springs 5c and 5d contact with each other while the third contact spring 5e is spaced away from the second contact spring 5d, that is, an on position or motor energizing position thereof in which the motor 4 is allowed to continue energization thereof. To the contrary, if the cover member 5b is pivoted in a clockwise direction in FIG. 7 against the spring forces of the first and third contact springs 5c and 5e from the motor energizing position of the switch 5, the switch 5 is brought into another position in which the first and second contact springs 5c and 5d contact with each other while the second and third contact springs 5d and 5e are spaced away from each other as shown in solid lines in FIG. 7, that is, an off position or motor deenergizing position thereof in which it interrupts energization of the motor 4.

Referring again to FIGS. 8 and 9, a first small diameter gear 13 is mounted in a concentrical relationship at a lower end portion of the reel shaft 3 and for integral rotation with the reel shaft 3 via a first frictional coupling means 12.

The first frictional coupling means 12 includes a coil spring 12a interposed between the second member 3b of the reel shaft 3 and the first small diameter gear 13, and a friction plate 12b interposed between the first member 3a and the reel shaft 3 and the first small diameter gear 13. During normal feeding of a tape 8b (FIG. 19), rotation of the first small diameter gear 13 is transmitted to the reel shaft 3 via the friction plate 12b under the spring force of the coil spring 12a. To the contrary, when the tape 8b within the tape cassette 8 is wound up to its last end, the reel shaft 3 is stopped by the tape 8b while the first small diameter gear 13 continues its rotation yielding a slip at the friction plate 12b.

Figure 35:
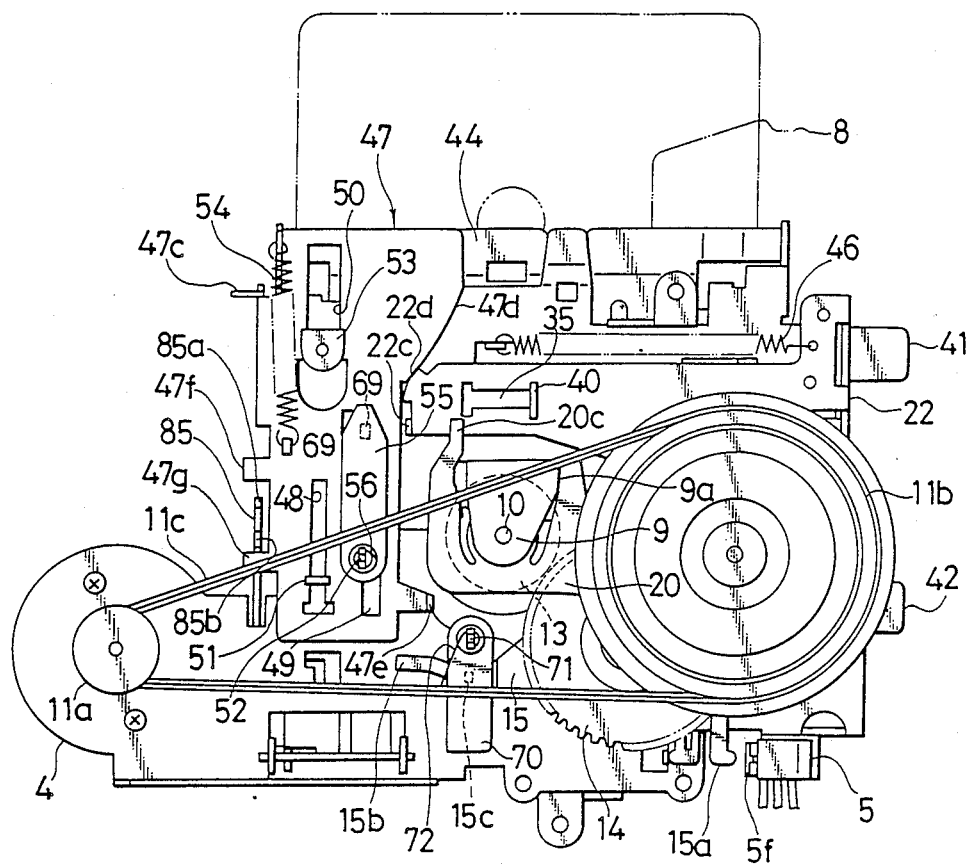
FIG. 35 is a bottom plan view of the cassette tape recorder mechanism of FIG. 1 in the reproducing mode.
Figure 37:
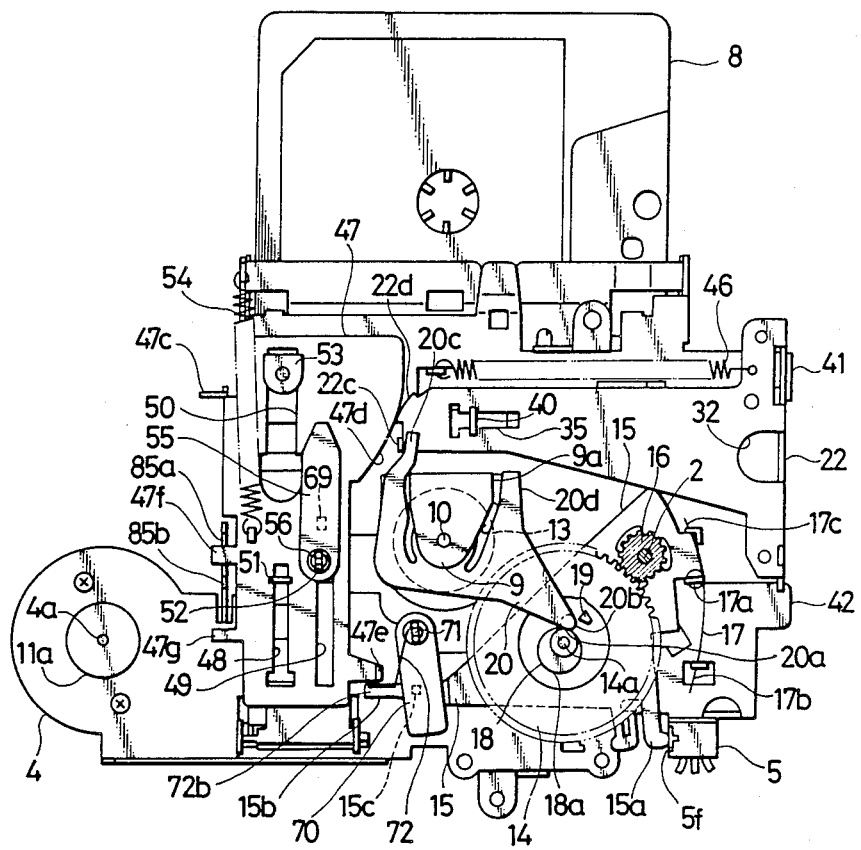
FIG. 37 is a bottom plan view, partly broken, of the cassette tape recorder mechanism of FIG. 1 when a tape cassette is ejected.

Referring back to FIGS. 1 to 6, a turning force transmitting member 14 in the form of a gear is mounted for meshing engagement with the first small diameter gear 13. In particular, the turning force transmitting member 14 is supported for rotation by means of a shaft 14a on a lower face of a pivotal member 15 which is in turn mounted for pivotal motion within a predetermined angular range around the capstan shaft 2 on the lower face of the chassis 1 as shown in FIG. 36. Referring also to FIG. 36, the turning force transmitting member 14 is normally held in meshing engagement with a second small diameter gear 16 which is mounted in an integral relationship on an upper face of the second pulley 11b at the lower end of the capstan shaft 2. The pivotal member 15 has a switch operating arm 15a located for engagement with the tongue 5f of the switch 5, an engaging arm 15b located for contacting with a bent pressing lug 47e of a stopping operating member 47 which will be hereinafter described, and an engaging projection 15c for slidably engaging with a cam groove 73 (FIG. 23) of an arresting member 70 which will also be hereinafter described. When the pivotal member 15 is pivoted in a clockwise direction in FIG. 2, the turning force transmitting member 14 is brought into meshing engagement with the first small diameter gear 13 of the reel shaft 3 as shown in FIG. 35 to allow the turning force of the capstan shaft 2 to be transmitted to the reel shaft 3 via the second small diameter gear 16, turning force transmitting member 14, first small diameter gear 13 and first frictional coupling means 12 while the switch operating arm 15a of the pivotal member 15 is brought out of engagement with the tongue 5f of the switch 5 to turn the switch 5 on as shown in solid lines in FIG. 35. On the contrary, when the pivotal member 15 is pivoted in a counterclockwise direction in FIG. 35, the turning force transmitting member 14 is brought out of meshing engagement with the first small diameter gear 13 of the reel shaft 3 as shown in phantom in FIG. 36 thereby to interrupt the transmission of the turning force from the capstan shaft 2 to the reel shaft 3 while the switch operating arm 15a of the pivotal member 15 is brought into engagement with the tongue 5f of the switch 5 to push and pivot the cover member 5b of the switch 5 in a clockwise direction in FIG. 7 against the spring forces of the first and third contact springs 5c and 5e thereby to turn the switch 5 off. The pivotal member 15 is normally biased by a torsion coil spring 17 in a clockwise direction in FIG. 36 to an operative home position in which the turning force transmitting member 14 is engaged with the first small diameter gear 13 of the reel shaft 3 and the switch operating arm 15a of the pivotal member 15 is disengaged from the tongue 5f of the switch 5 to cause the switch 5 to assume the motor energizing position at which the motor 4 is energized. The torsion coil spring 17 is secured at an intermediate coiled portion 17a and an end portion 17b thereof to predetermined locations of the chassis 1 and at the other end portion 17c thereof to a predetermined location of the pivotal member 15.

Figure 2:
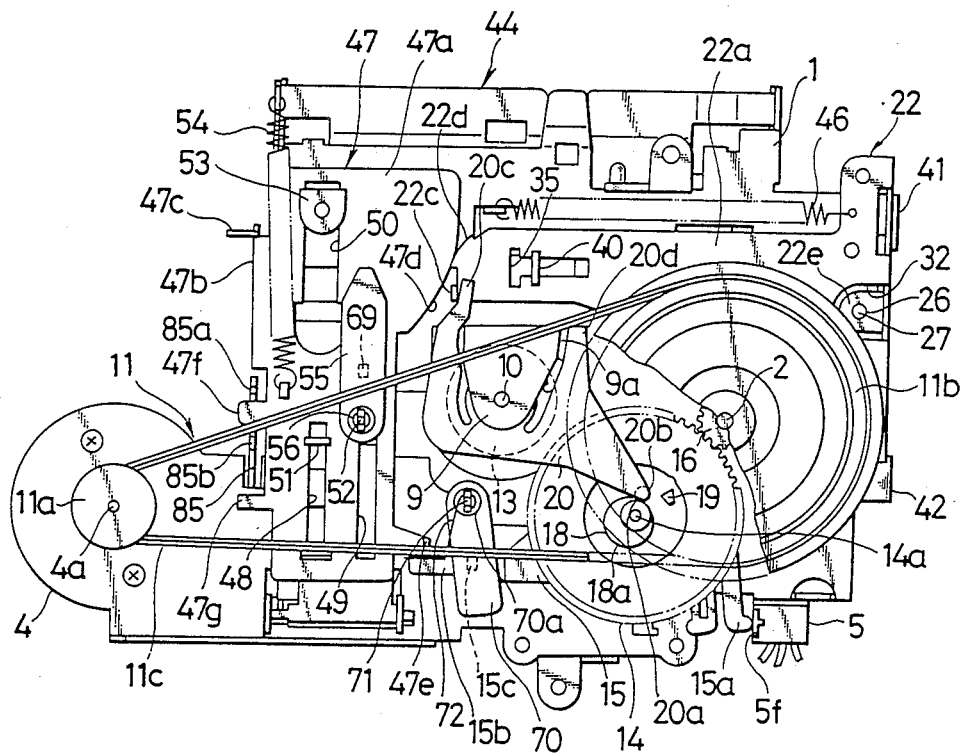
FIG. 2 is a bottom plan view of the cassette tape recorder mechanism of FIG. 1.
Figure 3:
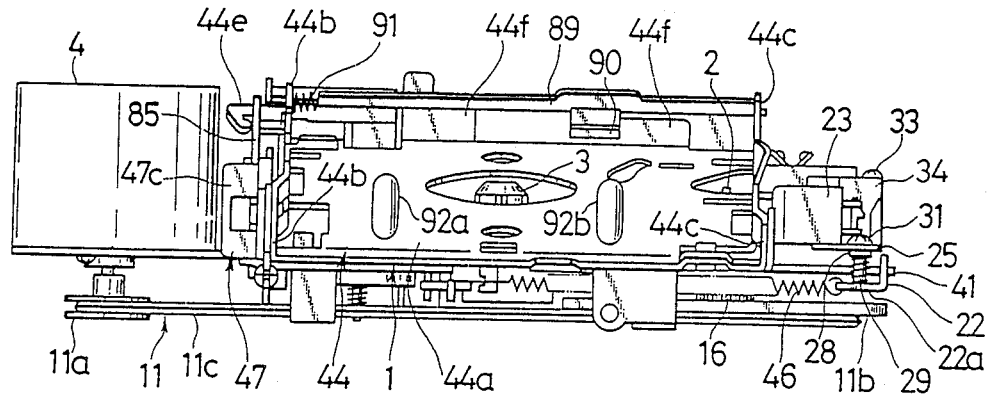
FIG. 3 is a front elevational view of the cassette tape recorder mechanism of FIG. 1 as viewed in a direction of an arrow mark III of FIG. 1.
Figure 4:
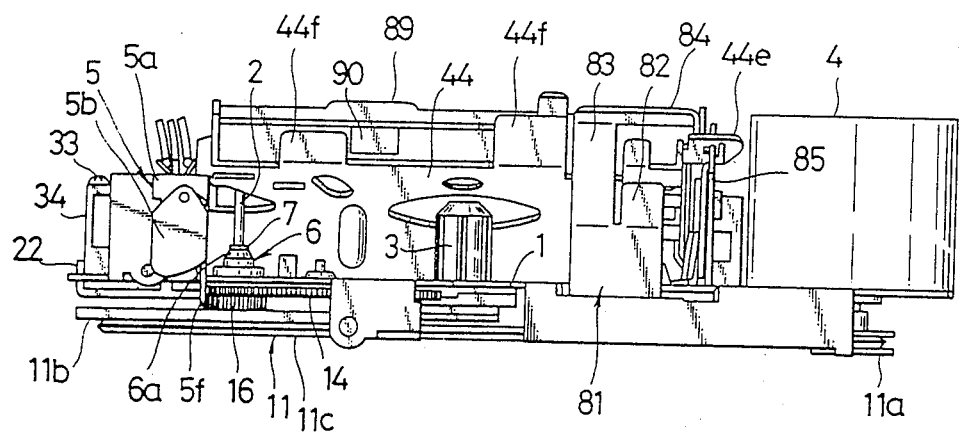
FIG. 4 is a rear elevational view of the cassette tape recorder mechanism of FIG. 1 as viewed in a direction of an arrow mark IV of FIG. 1.
Figure 5:
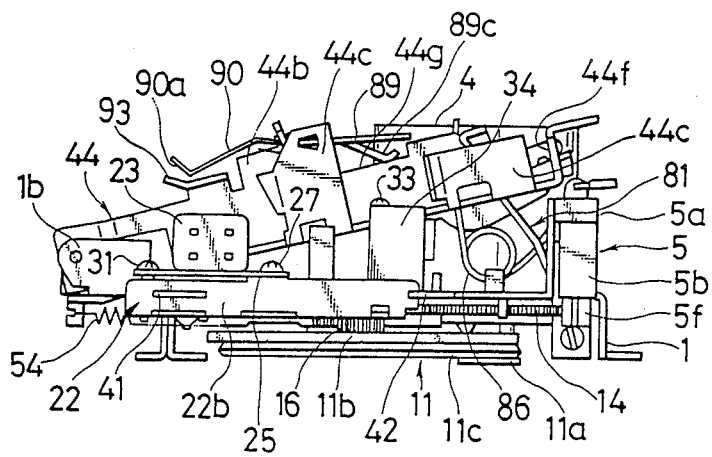
FIG. 5 is a right-hand side elevational view of the cassette tape recorder mechanism of FIG. 1 as viewed in a direction of an arrow mark V of FIG. 1.

A circular cam 18 is formed on a lower face of the turning force transmitting member 14 in an eccentric relationship to and around the shaft 14a of the turning force transmitting member 14 as shown in FIG. 2. The circular arm 18 has a cam face 18a on an outer periphery thereof. An operating means or projection 19 is formed on the lower face of the turning force transmitting member 14 in a spaced relationship from the outer periphery or cam face 18a of the circular cam 18. The circular cam 18 on the turning force transmitting member 14 is located for engagement with a cam engaging portion 20a at an end of a cam follower 20 while the operating projection 19 on the turning force transmitting member 14 is located for engagement by an engaging projection 20b formed at the same end of the cam follower 20.

Referring again to FIGS. 8 and 9, the cam follower 20 is formed from an elastic synthetic resin plate and has, in addition to the cam engaging portion 20a and the engaging projection 20b at the end thereof, an elastically deformable engaging arm 20c remove from the cam engaging portion 20a, an abutting arm 20d between the cam engaging projection 20a and the engaging arm 20c, and a pair of fingers located between the abutting arm 20d and the engaging arm 20c and defining a substantially C-shaped fitting recess 20e therein. A second frictional coupling means 21 is formed by the fitting recess 20e of the cam follower 20 which is resiliently fitted around an outer periphery of a lower end portion of the first member 3a of the reel shaft 3. Thus, a turning force of the reel shaft 3 is transmitted to the cam follower 20 via the second frictional coupling means 21 so that the cam follower 20 is urged in a clockwise direction in FIG. 2, that is, in a direction to slidably contact the cam engaging portion 20a of the cam follower 20 with the circular cam 18 and keep the engaging projection 20b spaced away from the operating projection 19 of the turning force transmitting member 14. To the contrary, if rotation of the reel shaft 3 is stopped, the urging force to pivot the cam follower 20 in the clockwise direction in FIG. 2 is removed. Consequently, as the turning force transmitting member 14 continues its counterclockwise rotation, the cam follower 20 is first pivoted in the counterclockwise direction in FIG. 2 by a maximum diameter portion of the circular cam 18 to a predetermined angular position in which the abutting arm 20d thereof is positioned near a stopper means 9a provided by an end face of the support plate 9 of the chassis 1 and the engaging projection 20b thereof is positioned on a locus of the operating projection 19 of the turning force transmitting member 14. After then, the cam follower 20 remains at the angular position so that as the turning force transmitting member 14 is further rotated, the engaging projection 20b of the cam follower 20 is engaged with the operating projection 19 of the turning force transmitting member 14 and stops further rotation of the turning force transmitting member 14 in the counterclockwise direction in FIG. 2. However, since the turning force transmitting member 14 tends to rotate further in the same direction, now the pivotal member 15 on which the turning force transmitting member 14 is supported for rotation is pivoted itself in the counterclockwise direction in FIG. 2 against the biasing force of the torsion coil spring 17.

The engaging arm 20c of the cam follower 20 is engaged by a head mounting plate 22 when the latter is moved from an operative mode position to a rest mode position thereof.

Referring to FIGS. 2, 10 to 12, the head mounting plate 22 is mounted for movement within a predetermined range on the lower face of the chassis 1. The head mounting plate 22 has a main plate portion 22a having a substantially triangular or trapezoidal shape in plan with a wide side located at one longitudinal end and a narrow side located at other other longitudinal end thereof, a side wall 22b extending perpendicularly upwardly from the wide side of the main plate portion 22a, a bent abutting lug 22c extending perpendicularly downwardly from a corner of the narrow side of the main plate portion 22a, and a bent engaging lug 22d extending perpendicularly upwardly from the other corner of the narrow side of the main plate portion 22a and having an arcuate shape in plan.

A reproducing magnetic head 23 and a pinch roller 24 are mounted on an upper face adjacent the wide side of the head mounting plate 22.

The magnetic head 23 is designed such that a front face thereof is contacted with a tape 8b within a tape cassette 8 as seen in FIG. 19, and a mounting bracket 25 is secured to a lower face of and extends rearwardly from the magnetic head 23. The mounting bracket 25 is fastened fixedly at one end thereof to a bent lug 22e of the head mounting plate 22 by means of a screw 27 screwed into a threaded hole 26 formed in the bent lug 22e. The bent lug 22e extends perpendicularly horizontally inwardly from a substantially central portion of an upper edge of the side wall 22b of the head mounting plate 22 in an opposing spaced relationship to the main plate portion 22a of the head mounting plate 22 and corresponds to a spacer member of a conventional tape feeding apparatus. The other end of the mounting bracket 25 overlies a washer 28 which is fitted around a headed screw 31 screwed into a threaded hole 30 in the main plate portion 22a of the head mounting plate 22 and is normally biased upwardly by a coil spring 29 fitted around the screw 31. Accordingly, as the screw 31 is turned, the other end of the mounting bracket 25 is adjusted in a vertical direction with respect to the one end of the mounting bracket 25 thereby to effect azimuth adjustment of the magnetic head 23, that is, fine adjustment of the inclination of the magnetic head 23 with respect to the feeding direction of the tape 8b. In order to assure the accuracy when the side wall 22b of the head mounting plate 22 is bent at the right angle by press work, the main plate portion 22a has an opening 32 formed therein as particularly seen in FIGS. 2 and 12. The opening 32 is located in an opposing relationship to the threaded hole 26 of the bent lug 22e of the head mounting plate 22 so as to enable a screw locking bonding agent to be applied therethrough to a lower threaded portion of the screw 27. It is to be noted here that although a screw locking effect of such a bonding agent is higher where it is applied to a lower end side threaded portion of a screw than wherein it is applied to a head side threaded portion of the screw, conventionally it is inevitable to apply a bonding agent to a head side threaded portion of a screw because it is difficult to apply the bonding agent to a lower end side threaded portion of the screw due to the fact that a conventional head mounting plate has no such an opening formed therein which enables the bonding agent to be applied therethrough to the lower end side threaded portion of the screw which extends between the head mounting plate and a chassis.

Figure 10:
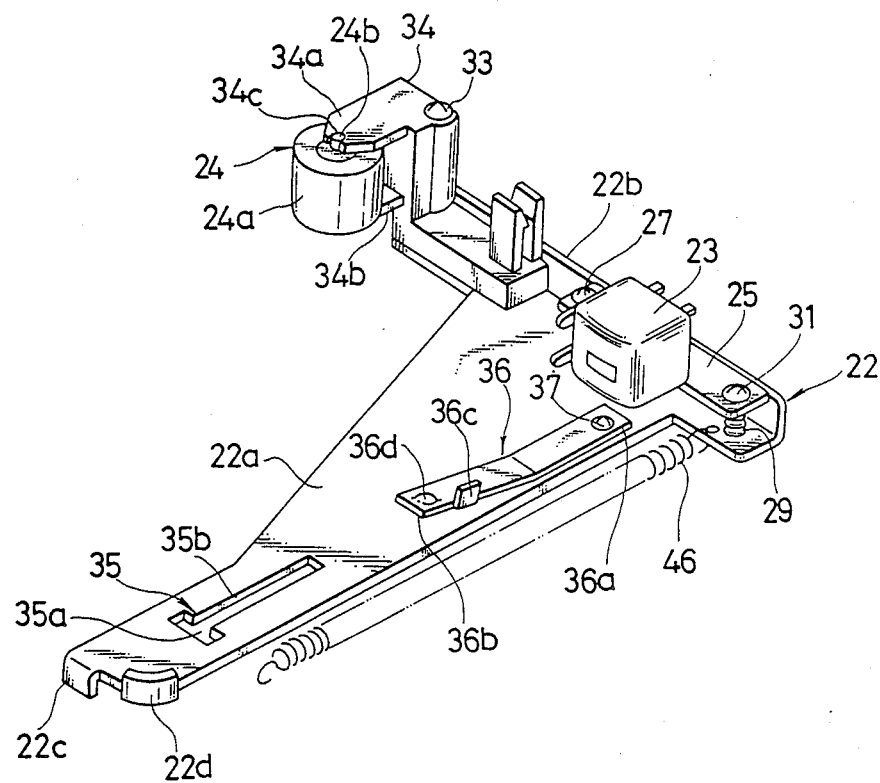
FIG. 10 is a perspective view of a head mounting plate of the cassette tape recorder mechanism of FIG. 1.
Figure 13:
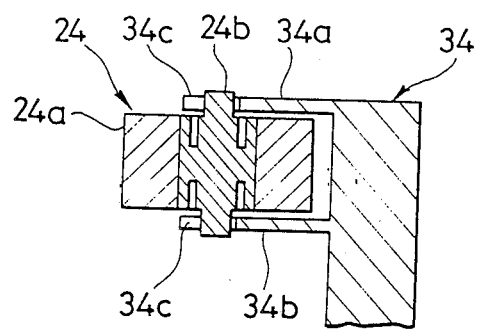
FIG. 13 is a cross sectional view of a reel shaft of the cassette tape recorder mechanism of FIG. 1.

The pinch roller 24 is mounted for contact with the capstan shaft 2 with a tape 8b of a tape cassette 8 interposed therebetween as shown in FIG. 19. Referring to FIGS. 10 and 13, the pinch roller 24 is supported for rotation on and between a pair of upper and lower mounting walls 34a, 34b of a mounting bracket 34 made of an elastic synthetic resin material and secured to the upper face of the main plate portion 22a of the head mounting plate 22 by means of a screw 33 and located sidewardly of the magnetic head 23.

The pinch roller 24 includes a roller body 24a made of a rubber material, and a shaft 24b made of a synthetic resin material and fitted for integral rotation at the center of the roller body 24a. In assembling the pinch roller 24, upper and lower opposite end portions of the shaft 24b thereof and forced laterally into fitting recesses 34c of a substantially C-shape in plan formed at central portions of ends of the upper and lower mounting walls 34a, 34b of the mounting bracket 34 making use of the elasticity of the mounting bracket 34. In this manner, the pinch roller 24 is assembled readily in position on and between the upper and lower mounting walls 34a, 34b of the mounting bracket 34 by a single operation, and in the assembled state, the pinch roller 24 can be rotated freely but cannot readily come off the mounting bracket 34. Accordingly, the shaft 24a of the pinch roller 24 cannot be moved laterally relative to the head mounting plate 22.

Figure 11:
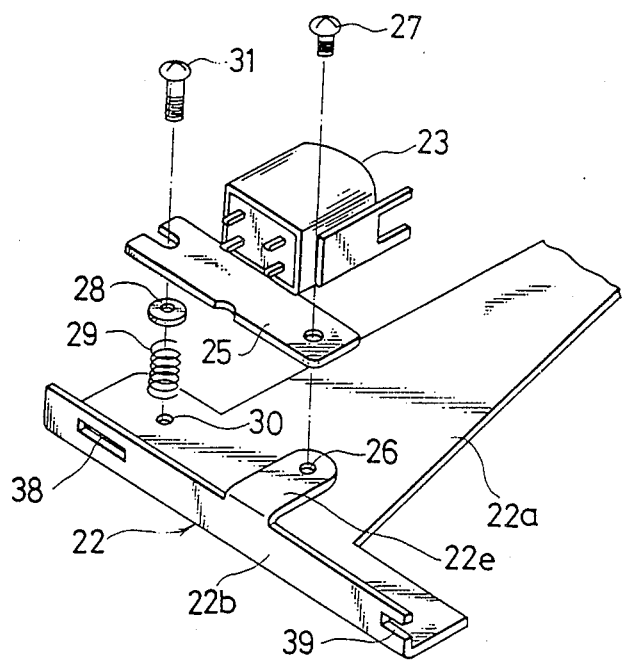
FIG. 11 is a fragmentary perspective view showing a head mounted on the head mounting plate of FIG. 10.
Figure 12:
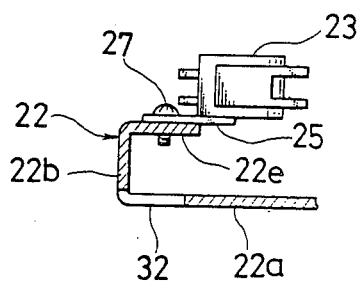
FIG. 12 is a cross sectional view of the head and the head mounting plate of FIG. 11.

An engaging hole 35 of a substantially T-shape in plan is perforated at a location adjacent the narrow end side of the main plate portion 22a of the head mounting plate 22, and a leaf spring 36 of a substantially flattened V-shape in side elevation is located at a location near the wide end side of the main plate portion 22a. The leaf spring 36 is secured at a base end portion 36a thereof to the main plate portion 22a by means of a screw 37, and extends in an upwardly gently inclined relationship toward the other free end portion 36b thereof. A vertically upwardly bent arresting lug 36c is formed on a side edge of the end portion 36b of the leaf spring 36. Referring to FIG. 11, a pair of engaging holes or slits 38, 39 are formed at locations adjacent opposite ends of the side wall 22b of the head mounting plate 22. The engaging hole 49 is open at an end thereof.

Figure 14:
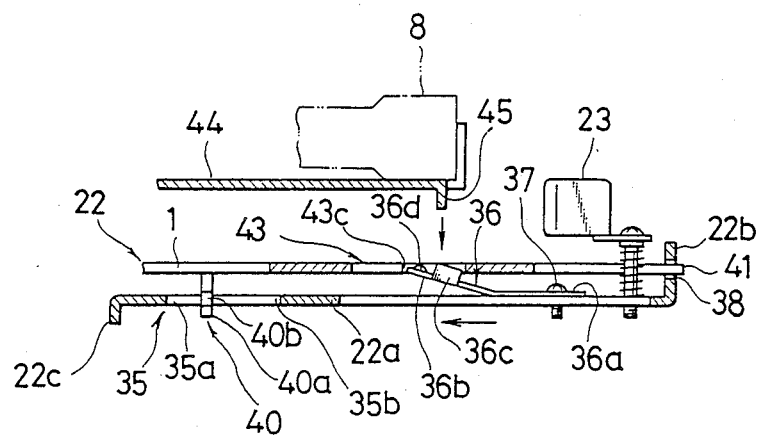
FIG. 14 is a cross sectional view showing the head mounting plate of FIG. 10 being assembled to a chassis.
Figure 15:
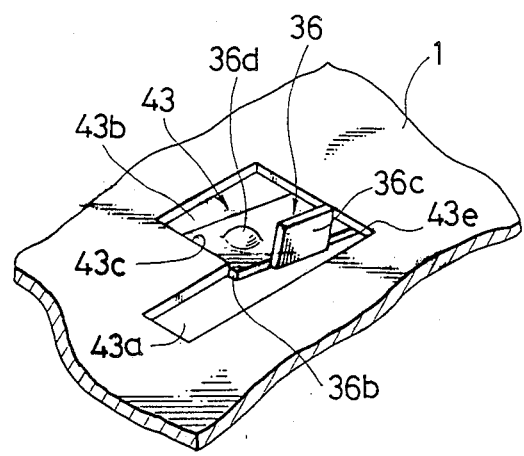
FIG. 15 is a perspective view showing a spring plate and an engaging hole of the chassis of FIG. 14.
Figure 16:
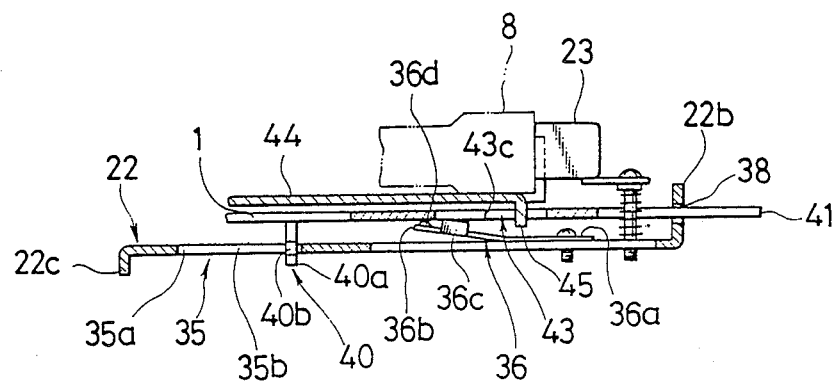
FIG. 16 is a cross sectional view of the head mounting plate assembled to the chassis of FIG. 14.
Figure 17:
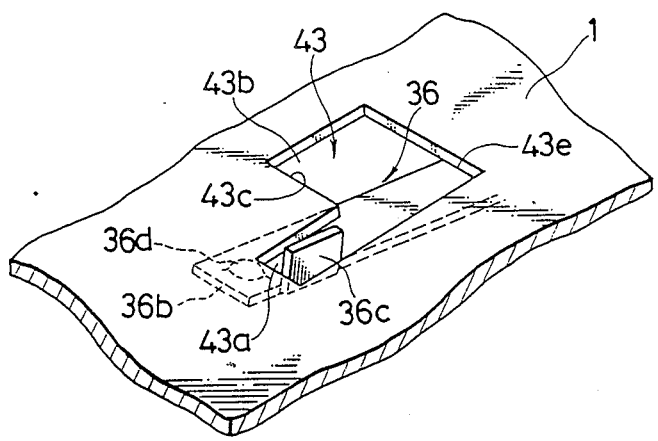
FIG. 17 is a perspective view the spring plate and the engaging hole of the chassis in the assembled condition of the head mounting plate to the chassis.

The head mounting plate 22 is mounted on the lower face of the chassis 1 in following steps. In particular, referring to FIGS. 2, 10 and 14 to 18, the head mounting plate 22 is moved upwardly toward the chassis 1 from below such that a widened portion 40a at an end of a substantially T-shaped engaging projection 40 formed as a vertically downwardly bent lug on the chassis 1 may be slidably fitted into a widened portion 35a at an end of the engaging hole 35 of the main plate portion 22a of the head mounting plate 22. After then, the head mounting plate 22 is moved in a leftward direction as indicated by an arrow mark in FIG. 14 toward its operative mode position such that a pair of guide tabs 41, 42 formed on the chassis 1 may be fitted into the engaging holes 38, 39 of the side wall 22b of the head mounting plate 22, respectively, until a narrower portion 40b of the engaging projection 40 of the chassis 1 is engaged with a narrower portion 35b of the engaging hole 35 of the chassis 1 and the end portion 36b and the arresting lug 36c of the leaf spring 36 are engaged, due to the elasticity thereof, into an engaging hole 43 of a substantially L-shape in plan perforated in the chassis 1 as shown in FIGS. 14 and 15. In the condition shown in FIGS. 14 and 15, the end portion 36b of the leaf spring 36 is positioned in register with a shoulder 43c at a boundary between a arrower portion 43a and a widened portion 43b of the engaging hole 43 of the chassis 1 so that further movement of the head mounting plate 22 in the leftward direction in FIG. 14 toward its operative mode position will be prevented by engagement between the shoulder 43c of the chassis 1 and the end portion 36b of the leaf spring 36 on the head mounting plate 22. In FIG. 14, the head mounting plate 22 is shown at its rest mode position in which the arresting lug 36c of the leaf spring 36 is engaged with an end edge 43e of the engaging hole 43 of the chassis 1 to prevent the head mounting plate 22 from being pulled off in the rightward direction in FIG. 14.

Such locking of the head mounting plate 22 against movement toward the operative mode position by the end portion 36b of the leaf spring 36 is canceled when a cassette holder 44 is set to a reproduction mode position.

Referring to FIGS. 1 to 6 and 30 to 34, the cassette holder 44 has a pair of side walls 44b, 44c extending vertically upwardly from opposite side edges of a bottom wall 44a thereof. The side walls 44b, 44c are mounted at one end portions thereof for pivotal motion within a predetermined angular range around a horizontal axis on inner faces of one end portions of a pair of opposite side walls 1a, 1b of the chassis 1. The cassette holder 44 is supported for pivotal motion between an ejecting or reset position in which it is inclined obliquely upwardly and spaced at its free end thereof away from the chassis 1 and another reproduction mode or set position in which it lies on the chassis 1. Thus, when the cassette holder 44 is pivoted downwardly, a bent pressing projection 45 (FIGS. 14 and 16) which extends vertically downwardly from the cassette holder 44 is fitted into the engaging hole 43 of the chassis 1 and presses the end portion 36b of the leaf spring 36 downwardly against the spring force of the leaf spring 36 until the end portion 36b of the leaf spring 36 is brought out of register with the boundary shoulder 43c of the engaging hole 43 of the chassis 1 and positioned between the chassis 1 and the head mounting plate 22. In this condition, the head mounting plate 22 is allowed to move from the rest mode position shown in FIG. 14 to the operative mode position shown in FIG. 16, and the end portion 36b of the leaf spring 36 is positioned between the chassis 1 and the head mounting plate 22. In the position of the end portion 36b of the leaf spring 36, the head mounting plate 22 is biased in a direction away from the chassis 1 by the spring force of the leaf spring 36, thereby eliminating a possible play of the head mounting plate 22. It is to be noted that the leaf spring 36 has an upwardly swollen semispherical sliding contact face 36d formed at a substantially central location of an upper face of the end portion 36b of the leaf spring 36 for sliding contact with the lower face of the chassis 1.

The head mounting plate 22 is mounted on the chassis 1 in such a manner as described above. Since the leaf spring 36 is located on the head mounting plate 22 and the engaging hole 43 for engagement by the end portion 36b of the leaf spring 36 is formed in the chassis 1 in this manner, a play of the head mounting plate 22 is prevented and the timing at which movement of the head mounting plate 22 toward the operation mode position is started can be synchronized assuredly with a loading operation of a cassette. Besides, the head mounting plate 22 can be mounted readily on the chassis 1 by a simple operation, and after such mounting of the head mounting plate 22, the head mounting plate 22 can be prevented from being pulled off the chassis 1.

The head mounting plate 22 is normally biased toward its operation mode position, that is, in the leftward direction in FIG. 2 by a coil spring 46. The coil spring 46 is secured at an end thereof to the main plate portion 22a of the head mounting plate 22 and at the other end thereof to the chassis 1.

Thus, the pinch roller 24 is pressed against the capstan shaft 2 by the biasing force of the coil spring 46 thereby to set a reproduction mode position of the magnetic head 23.

As the head mounting plate 22 is moved from the operation mode position to the rest mode position, the abutting lug 22c of the head mounting plate 22 is engaged with the engaging arm 20c of the cam follower 20 to pivot the cam follower 20 in the clockwise direction in FIG. 2 until the cam engaging portion 20a of the cam follower 20 is engaged with the cam face 18a of the circular cam 18.

As the stopping operating member 47 which is also used for ejecting operation is moved from its operation mode position to its rest mode position, the head mounting plate 22 is pushed to move in the rightward direction in FIG. 2 toward its rest mode position against the biasing force of the coil spring 46.

Figure 6:
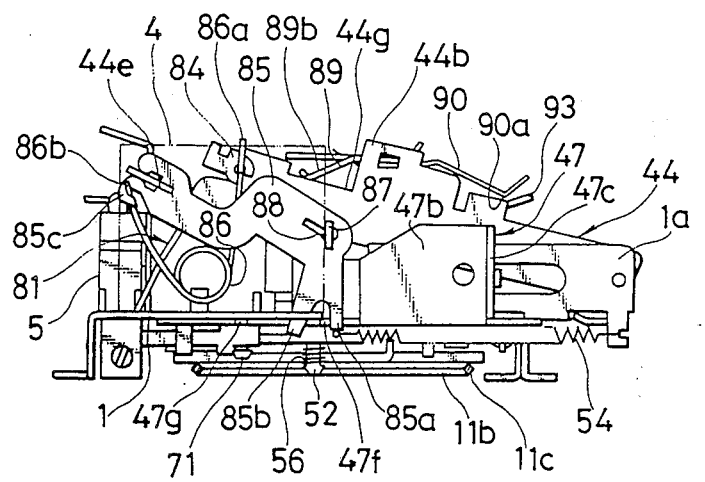
FIG. 6 is a left-hand side elevational view of the cassette tape recorder mechanism of FIG. 1 as viewed in a direction of an arrow mark VI of FIG. 1.

Referring to FIGS. 2 and 6, the stopping operating member 47 has a main body portion 47a, a side wall portion 47b extending vertically upwardly from a side edge of the main body portion 47a, and a front wall portion 47c extending perpendicularly outwardly from a forward end of the side wall portion 47b. The stopping operating member 47 is mounted for movement within a predetermined range with the main body portion 47a thereof located on the lower face of the chassis 1 and with the side wall portion 27b thereof located on an outer face of the side wall 1a of the chassis 1. The main body portion 47a of the stopping operating member 47 has first, second and third elongated engaging holes 48, 49, 50 preforated therein. First, second and third bent engaging projections 51, 52, 53 are formed on and extend downwardly from the chassis 1. The first to third bent engaging projections 51 to 53 are engaged for sliding movement in the first to third engaging holes 48 to 50, respectively. The main body portion 47a of the stopping operating member 47 has a guide face 47d in the form of an inclined curved face formed on the other edge thereof for sliding contact with the bent engaging lug 22d. Thus, if the stopping operating member 47 is manually pushed to move from its operation mode position to its first actuated position or fast feeding mode position, the head mounting plate 22 is moved, through sliding engagement between the guide face 47d of the stopping operating member 47 and the bent engaging lug 22d of the head mounting plate 22, from its reproduction mode position against the biasing force of the coil spring 46 to its fast feeding mode position in which the pinch roller 24 is spaced by a little distance from the capstan shaft 2. If the stopping operating member 47 is further pushed to move from the first actuated position to a second actuated position or ejection/rest mode position, the head mounting plate 22 is further moved, through sliding contact between the guide face 47d and the bent engaging lug 22d, against the biasing force of the coil spring 46 to a rest mode position or ejecting position in which the pinch roller 24 is spaced by a maximum distance from the capstan shaft 2. The stopping operating member 47 is normally biased toward the reproduction mode position in an upward direction in FIG. 2 by a coil spring 54. The coil spring 54 is secured at one end thereof to the lower face of the chassis 1 and at the other end thereof to a lower face of the main body portion 47a of the stopping operating member 47.

After the stopping operating member 47 is moved from the reproduction mode position to the first actuated position, it is arrested at the first actuated position by a hook 55.

Figure 20:
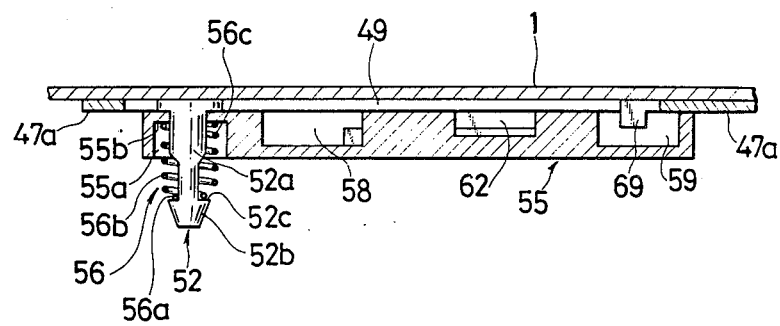
FIG. 20 is a cross sectional view of a hook mounted on the chassis of the cassette tape recorder mechanism of FIG. 1.

Referring to FIGS. 2 and 20, the hook 55 is formed as an elongated plate and is located on the lower face of the main body portion 47a of the stopping operating member 47. The hook 55 has a fitting hole 55a formed at one end portion thereof and loosely fitted on the second engaging projection 52 on the lower face of the chassis 1 so as to allow the hook 55 to be pivoted around the second engaging projection 52 and also in a plane containing the second engaging projection 52 but by a limited angle. The hook 55 is normally biased by a coil spring 56 in a direction to closely contact with the lower face of the main body portion 47a of the stopping operating member 47. The coil spring 56 has a smaller inner coil diameter at a lower end portion 56a thereof in FIG. 20 than the inner coil diameter at the other portion 56b thereof. Meanwhile, the second engaging projection 52 of the chassis 1 has a head portion 52b at a lower end in FIG. 20 of a body portion 52a thereof. The body portion 52a of the second engaging projection 52 has a width smaller than the inner coil diameter of the portion 56b of the coil spring 56 while the head portion 52b has a trapezoidal shape in side elevation wherein the maximum width thereof is greater than the inner coil diameter of the end portion 56a of the coil spring 56. Thus, in assembling the hook 56, it is first mounted onto the chassis 1 from below such that the fitting hole 55a thereof is fitted around the second engaging projection 52 of the chassis 1, and then the coil spring 56 is fitted around the second engaging projection 52 until a base end portion 56c thereof is seated on a spring seat 55b on an inner end face of the fitting hole 55a. After then, the end portion 56a of the coil spring 56 is forced to pass the head portion 52b of the second engaging projection 52 therethrough utilizing the elasticity thereof until it comes to a position a little above a step 52c between the head portion 52b and the body portion 52a of the second engaging projection 52. As a result, the coil spring 56 is located in a compressed condition between the spring seat 55b of the hook 55 and the step 52c of the second engaging projection 52.

With such a construction as described above, assembly of the hook 55 to the second engaging projection 52 of the chassis 1 and assembly of the coil spring 56 for biasing the hook 55 toward the stopping operating member 47 can be effected readily.

Figure 21:
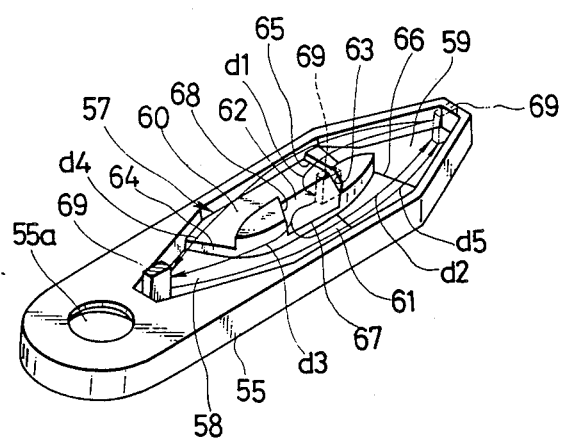
FIG. 21 is a perspective view of the hook of FIG. 20.

Referring to FIG. 21, the hook 55 has a cam groove 57 formed on an upper face thereof. The cam groove 57 is engaged with an engaging projection 69 formed on the stopping operating member 47 to operate the stopping operating member 47 and has a deep pushing allowing portion 58, a returning allowing portion 59, a forward path portion 60, a return path portion 61, a bypass portion 62, an arresting portin 63, and first, second, third, fourth and fifth steps or guide portions 64, 65, 66, 67 and 68.

The deep pushing allowing portion 58 is provided so as to allow the stopping operating member 47 to be pushed deeply from its reproduction mode position or its fast feeding mode position to its second actuated or ejecting position. The deep pushing allowing portion 58 is located adjacent one end of the hook 55 on a line of a longitudinal axis of the hook 55.

The returning allowing portion 59 of the hook 55 is provided so as to allow returning of the stopping operating member 47 to its reproduction mode position. The returning allowing portion 59 is located on the longitudinal axial line adjacent the other end of the hook 55. The forward path portion 60 and the return path portion 61 are connected to one end of the returning allowing portion 59.

The foward path portion 60 and the return path portion 61 are formed in a spaced symmetrical relationship to the longitudinal axial line of the hook 55.

The bypass portion 62 communicates an intermediate portion of the forward path portion 60 with an intermediate portion of the return path portion 61.

The arresting portion 63 is formed by a side face of the hook 55 partially defining the bypass portion 62 and is provided so as to removably arrest the engaging projection 69 of the stopping operating member 47 to arrest the stopping operating member 47 at its first actuated position or fast feeding mode position.

The first guide portion 64 is formed between the deep pushing allowing portion 58 and the forward path portion 60 so as to prevent the engaging projection 69 from advancing from the deep pushing allowing portion 58 into the forward path portion 60.

The second guide portion 65 is formed between the returning allowing portion 59 and the forward path portion 60 so as to prevent the engaging projection 69 from advancing from the forward path portion 60 into the returning allowing portion 59.

The third guide portion 66 is formed between the returning allowing portion 59 and the return path portion 61 so as to prevent the engaging projection 69 from advancing from the returning allowing portion 59 into the return path portion 61.

The fourth guide portion 67 is formed between the return path portion 61 and the bypass portion 62 so as to prevent the engaging projection 69 from advancing from the return path portion 61 into the bypass portion 62.

The fifth guide portion 68 is formed as a side face of the hook 55 opposing to the arresting portion 63 across the arresting portion 63 for introducing the engaging projection 69 released from the arresting portion 63 into the return path portion 61.

Thus, when the stopping operating member 47 is at its reproduction mode position, the engaging projection 69 thereon is positioned at a position shown in two dot chain lines in FIG. 21. If the stopping operating member 47 in its reproduction mode position is pushed in by a relatively small distance to its first actuated or fast feeding mode position, the engaging projection 69 moves in a direction as indicated by an arrow mark d1 in FIG. 21 until it is engaged with the arresting portion 63 of the cam groove 57 of the hook 55 as shown in broken lines in FIG. 21. The stopping operating member 47 is thereafter arrested at the first actuated position, that is, the fast feeding mode position. If the stopping operating member 47 in the fast feeding mode position is pushed in by a little distance toward the ejecting position and then the pushing in force to the stopping operating member 47 is removed, the engaging projection 69 is released from the arresting portion 63 and then introduced into the return path portion 61 by the fifth guide portion 68 whereafter it moves in a direction as indicated by an arrow mark d2 in FIG. 21 until it returns to its reproduction mode position shown in two dot chain lines in FIG. 21. To the contrary, if the stopping operating member 47 in the fast feeding mode position is pushed in by a long distance toward the ejecting position, the engaging projection 69 is released from the arresting position 63 and thus introduced into the return path portion 61 by the fifth guide portion 68 whereafter it moves in a direction as indicated by an arrow mark d3 in FIG. 21 until it reaches the ejecting position shown in solid lines in FIG. 21. On the other hand, if the stopping operating member 47 in the reproduction mode position is pushed in to the second actuated position or ejecting position farther than the first actuated position, the engaging projection 69 moves in a direction as indicated by an arrow mark d4 in FIG. 21 until it reaches the ejecting position shown in solid lines in FIG. 21. On the contrary, when the stopping operating member 47 is moved from the ejecting position to the reproduction mode position, the engaging projection 69 moves along the return path portion 61 in a direction as indicated by an arrow mark d5 in FIG. 21 until it reaches the reproduction mode position shown in two dot chain lines in FIG. 21.

As the stopping operating member 47 approaches the ejecting position, it releases the pivotal member 15 from a counterclockwise (in FIG. 2) pivoted position or inoperative position at which the pivotal member 15 has been arrested by the arresting member 70 and in which the pivotal member 15 causes the switch 5 to assume the motor deenergizing position, and then it arrests the pivotal member 15 at the pivoted position.

Figure 22:
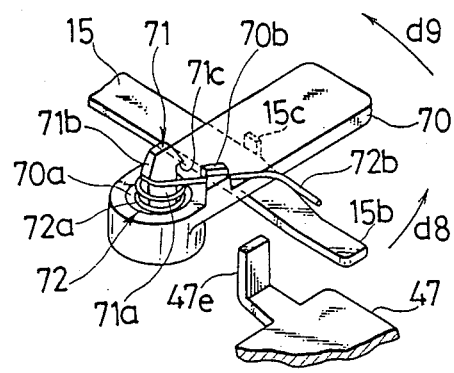
FIG. 22 is a perspective view showing relative positions of a pivotal member, a stopping operating member and an arresting member of the cassette tape recorder mechanism of FIG. 1.

Referring now to FIGS. 2 and 22, the arresting member 70 is formed as an elongated plate and is located on the lower face of the pivotal member 15. The arresting member 70 has a fitting hole 70a formed at an end portion thereof and fitted on a bent arresting projection 71 formed on and extending downwardly from the chassis 1 so that the arresting member 70 can be pivoted around the arresting projection 71 and also in a plane containing the arresting projection 71 but by a limited angle. The arresting member 70 is normally biased by a torsion coil spring 72 in a direction to closely contact with the lower face of the pivotal member 15. The arresting member 70 is also biased in a counterclockwise direction in FIG. 2 by the torsion coil spring 72 when the stopping operating member 47 is moved to the ejecting position.

The relation between a coiled portion 72a of the torsion coil spring 72 and the arresting projection 71 of the chassis 1 is similar to that between the coil spring 56 for the hook 55 and the second engaging projection 52 of the chassis 1 described hereinabove. Thus, in order to assemble the arresting member 70, it is first placed from below onto the bottom face of the chassis 1 with the fitting hole 70a thereof fitted on the arresting projection 71, and then the coiled portion 72a of the torsion coil spring 72 is fitted on the arresting projection 71 until a base end portion of the coiled portion 72a is seated on a spring seat not shown formed at an inner end of the fitting hole 70a and a smaller diameter portion of the coiled portion 72a passes a step 71c at a boundary between a body portion 71a and a trapezoidal head portion 71b of the arresting projection 71. The torsion coil spring 72 has adjacent the smaller diameter portion of the coiled portion 72a thereof an extension 72b which is received in an arresting groove 70b formed at an end of a lower projection of the arresting member 70 and extends laterally outwardly from the arresting member 70. The extension 72b of the torsion coil spring 72 is located for contacting with the bent pressing lug 47e formed at an end of the stopping operating member 47. When the pressing lug 47e of the stopping operating member 47 is engaged with and pushes the extension 72b of the torsion coil spring 72, the torsion coil spring 72 exerts a biasing force to bias the arresting member 70 in the counterclockwise direction in FIG. 2.

The engaging arm 15b of the pivotal member 15 is also located for engagement by the pressing lug 47e of the stopping operating member 47, and when it is engaged by the latter, the pivotal member 15 is pushed to pivot in the counterclockwise direction in FIG. 2, that is, in a direction to turn the switch 5 off.

Figure 23:
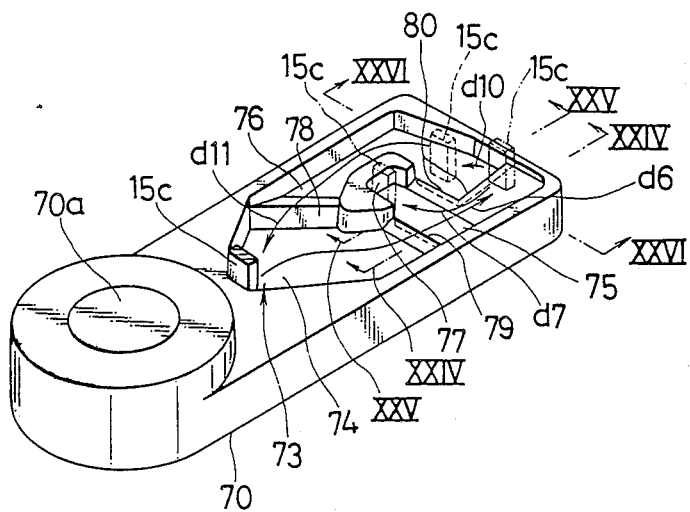
FIG. 23 is a perspective view of the arresting member of FIG. 22.

Referring to FIG. 23, the arresting member 70 has a cam groove 73 formed on an upper face thereof, and the engaging projection 15c of the pivotal member 15 is slidably engaged in the cam groove 73. The cam groove 73 has a returning allowing portion 74, a forward path portion 75, a return path portion 76, an arresting portion 77, and first, second and third steps or guide portions 78, 79 and 80.

The returning allowing portion 74 is provided so as to allow pivotal returning motion of the pivotal member 15 in the clockwise direction in FIG. 2 to the operative home position in which the pivotal member 15 causes the switch 5 to assume the motor energizing position. The returning allowing portion 74 is located adjacent one end of the arresting member 70 on a line of a longitudinal axis of the arresting member 70, and one ends of the forward path portion 75 and the return path portion 76 are connected to the returning allowing portion 74.

The forward path portion 75 and the return path portion 76 are formed in a spaced relationship on opposite locations of the arresting member 70 with respect to the longitudinal axial line of the arresting member 70. The other ends of the forward path portion 75 and the return path portion 76 are located adjacent the other end of the arresting member 70 and are connected to each other.

The arresting portion 77 is formed at a substantially central location of the arresting member 70, and when the pivotal member 15 is provoted in the counterclockwise direction in FIG. 2 to turn the switch 5 off after stopping of rotation of the reel shaft 3, the engaging projection 15c thereon is introduced via part of the forward path portion 75 into and thereafter arrested by the arresting portion 77 of the arresting member 70 to arrest the pivotal member 15 to its pivoted inoperative position.

The first guide portion 78 is formed so as to prevent the engaging projection 15c from advancing from the returning allowing portion 74 into the return path portion 76.

Figure 24:
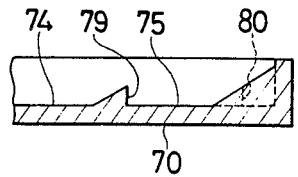
FIG. 24 is a cross sectional view taken along line XXIV—XXIV of FIG. 23.
Figure 25:
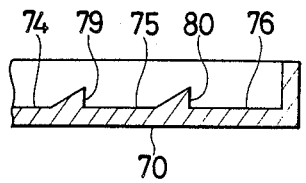
FIG. 25 is a cross sectional view taken along line XXV—XXV of FIG. 23.

The second guide portion 79 is formed so as to prevent the engaging projection 15c from advancing from the forward path portion 75 into the returning allowing portion 74 as seen from FIGS. 24 and 25.

Figure 26:
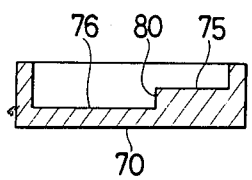
FIG. 26 is a cross sectional view taken along line XXVI—XXVI of FIG. 23.

The third guide portion 80 is formed so as to prevent the engaging projection 15c from advancing from the return path portion 76 into the forward path portion 75 as seen from FIGS. 25 and 26.

Thus, when the reel shaft 3 is rotating, the pivotal member 15 is in its pivoted inoperative position to which it has been pivoted in the clockwise direction in FIG. 2 by the biasing force of the torsion coil spring 17, and in this position, the engaging projection 15c of the pivotal member 15 is positioned at a position as shown in solid lines in FIG. 23. In this condition, if rotation of the reel shaft 3 is stopped and consequently the pivotal member 15 is pivoted in the counterclockwise direction in FIG. 2 against the biasing force of the torsion coil spring 17, the engaging projection 15c thereon moves toward the other end of the forward path portion 75 as indicated by an arrow mark d6 in FIG. 23 until it reaches a position shown in two dot chain lines in FIG. 23. Then, upon subsequent stopping of the motor 5, the pivotal member 15 is pivoted back in the clockwise direction in FIG. 2 by the biasing force of the torsion coil spring 17 but by a small distance because thereupon the engaging projection 15c thereon moves in a direction indicated by an arrow mark d7 in FIG. 23 along the forward path portion 75 only until it is engaged with and stopped by the second guide portion 79 and then the arresting portion 77 as shown in long and short dash lines in FIG. 23 to arrest the pivotal member 15 to its pivoted inoperative position.

If the stopping operating member 47 is moved to its ejecting position while the pivotal member 15 is arrested at the pivoted inoperative position, the engaging arm 15b of the pivotal member 15 is pushed in a direction indicated by an arrow mark d8 in FIG. 22 by the pressing lug 47e of the stopping operating member 47 so that the pivotal member 15 is pivoted in the counterclockwise direction in FIG. 2 whereupon the engaging projection 15c thereon is released from the arresting portion 77 and moves in a direction opposite to the direction of the arrow mark d7 in FIG. 23 to the position shown in two dot chain lines in FIG. 23 at the other end of the forward path portion 75. Meanwhile, when the stopping operating member 47 is moved to its ejecting position, the extension 72b of the torsion coil spring 72 is pressed in the same direction with the engaging arm 15b of the pivotal member 15 by the pressing lug 47e of the stopping operating member 47 so that the torsion coil spring 72 exerts a biasing force in a direction to pivot the arresting member 70 in the clockwise direction in FIG. 2. By the biasing force of the torsion coil spring 72, the arresting member 70 is pivoted in the counterclockwise direction in FIG. 2, that is, in a direction indicated by an arrow mark d9 in FIG. 22 whereupon the engaging projection 15c of the pivotal member 15 moves toward the other end of the return path portion 76 as indicated by an arrow mark d10 in FIG. 23 until it comes to a position shown in a broken lines in FIG. 23.

In this manner, the stopping operating member 47 has dual functions, when it is moved to its ejecting position, on one hand to cancel an arrested condition by the arresting member 70 of the pivotal member 15 at the pivoted inoperative position in which the pivotal member 15 causes the switch 5 to assume the motor deenergizing position and on the other hand to arrest to pivotal member 15 to the pivoted inoperative position in which the pivotal member 15 causes the switch 5 to assume the motor deenergizing position.

If the stopping operating member 47 is moved to its reproduction mode position from such an arresting condition at the ejecting position, the pivotal member 15 is pivoted in the clockwise direction in FIG. 2 by the biasing force of the torsion coil spring 17 to turn the switch 5 on whereupon the engaging projection 15c thereon passes the return path portion 76 as indicated by an arrow mark d11 in FIG. 23 until it comes back to the position at the returning allowing portion 74 as shown in solid lines in FIG. 23.

By moving the stopping operating member 47 to its ejecting position, the cassette holder 44 is pivoted from the set position to the reset position. To the contrary, by putting a tape cassette 8 into the cassette holder 44 and pushing the tape cassette 8 in to a predetermined position, the cassette holder 44 is pivoted from the reset position to the set position.

Referring to FIG. 19, as the cassette holder 44 is pivoted from the reset position to the set position, one of the capstan shaft fitting holes 8a and one of a pair of reel shaft fitting holes 8c of the tape cassette 8 inserted in the cassette holder 44 are fitted on the capstan shaft 2 and the reel shaft 3, respectively, while the magnetic head 23 and the pinch roller 24 are moved into the tape cassette 8 through openings 8d, 8e, respectively, formed in the tape cassette 8 until they are contacted with a tape 8b within the tape cassette 8. In order to allow the magnetic head 23 and the pinch roller 24 to move into and out of the tape cassette 8, the said wall 44c of the cassette holder 44 is divided into three sections as shown in FIG. 1 which define therebetween a pair of openings opposing to the openings 8d, 8e of the tape cassette 8.

Then, as the cassette holder 44 is pivoted from the set position to the reset position, the capstan shaft 2 and the reel shaft 3 are removed from the capstan shaft fitting hole 8a and the reel shaft fitting hole 8c of the tape cassette 8, respectively, while the magnetic head 23 and the pinch roller 24 are also removed from within the tape cassette 8 and from the tape 8b.

Referring to FIGS. 1 to 6, the cassette holder 44 can be arrested at its reset position by a latching member 81. The latching member 81 has a short latching piece 82 and a tall cassette ejecting piece 83 formed in a juxtaposed relationship at left and right locations thereof as particularly seen in FIG. 4. The cassette ejecting piece 83 has a bent spring anchor 84 formed at an upper end thereof and extending in a horizontally rightward direction in FIG. 4.

Figure 27:
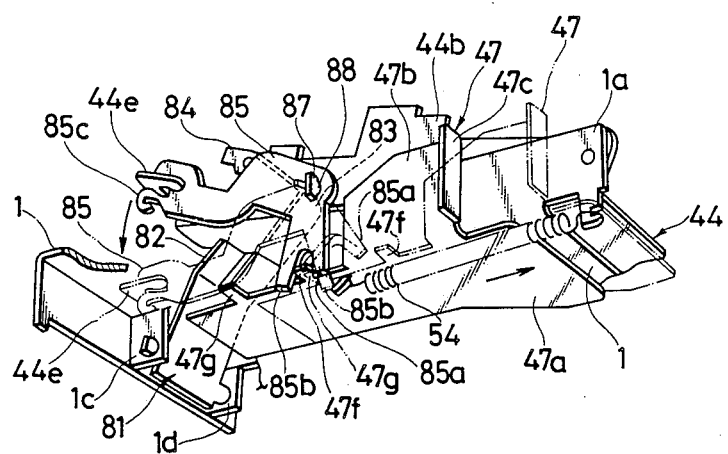
FIG. 27 is a perspective view showing relative positions of the stopping operating member of FIG. 22 and an interlocking member.

Referring also to FIG. 27, the latching member 81 has a pair of horizontally extending tabs formed on opposite sides of a lower end thereof and received in round holes perforated in a pair of bent lugs 1c, 1d of the chassis 1 so as to allow pivotal motion of the latching member 81. When the latching member 81 is pivoted in a cassette removing direction, that is, in a clockwise direction in FIG. 27, the latching piece 82 thereof is engaged with a lower face of the cassette holder 44 to prevent pivotal motion of the cassette holder 44 toward its set position while the cassette ejecting piece 83 thereof pushes back the tape cassette 8 within the cassette holder 44 in the removing direction. To the contrary, if the tape cassette 8 is inserted into the cassette holder 44 to a predetermined position, the cassette ejecting piece 83 of the latching member 81 is pushed by the tape cassette 8 to pivot the latching member 81 in an inserting direction, that is, in a counterclockwise direction in FIG. 27 to disengage the latching piece 82 thereof from the lower face of the cassette holder 44 thereby to cancel the arresting condition of the latching member 81. It is to be noted that the cassette holder 44 has a recess 44d (FIG. 1) formed therein for allowing the cassette ejecting piece 83 of the latching member 81 to make such a pivotal motion therein.

The cassette holder 44 is operatively connected to the stopping operating member 47 by an interlocking member 85. The interlocking member 85 is mounted at an intermediate portion thereof for pivotal motion on the side wall 1a (left-hand side wall in FIG. 1) of the chassis 1 and is pivotally connected at one end thereof to a bent connecting tab 44e formed at a corner of the cassette holder 44. The interlocking member 85 is bifurcated at the other end thereof to provide first and second engaging fingers 85a, 85b which extend downwardly from the center of pivotal motion of the interlocking member 85. The first engaging finger 85a of the interlocking member 85 is located for engagement by a first engaging tab 47f formed on a side edge of the stopping operating member 47 while the second engaging finger 85b is located for engagement by the first engaging tab 47f and a second engaging tab 47g formed on the side edge of the stopping operating member 47 in a spaced relationship by a predetermined distance in the direction of movement of the stopping operating member 47 from the first engaging tab 47f. Thus, when the stopping operating member 47 is moved forwardly from the reproduction mode position to the ejecting position, the first engaging tab 47f thereon passes against the second engaging finger 85b of the interlocking member 85 to pivot the interlocking member 85 in the clockwise direction in FIG. 33 to pivot the cassette holder 44 away from the chassis 1 to the reset position. After pivotal motion of the cassette holder 44 to the reset position, the first engaging tab 47f of the stopping operating member 47 is engaged with the first engaging finger 85a of the interlocking member 85 to arrest the stopping operating member 47 at its ejecting position against the biasing force of the coil spring 54. To the contrary, when the stopping operating member 47 is moved reversely from the ejecting position to the reproduction mode position, the first engaging tab 47f thereof first presses against the first engaging finger 85a of the interlocking member 85 and then the second engaging tab 47g thereof passes against the second engaging finger 85b under the biasing force of the coil spring 54 to help the interlocking member 85 to pivot in a counterclockwise direction in FIG. 6 whereupon the cassette holder 44 is pivoted toward the chassis 1 to its set position.

Referring to FIGS. 1, 6, 31 and 33, a torsion coil spring 86 is anchored at opposite ends 86a, 86b thereof to the spring anchor 84 of the latching member 81 and a spring anchor 85c at the one end of the interlocking member 85, respectively, and has a function to bias the cassette holder 44 toward its set position.

Figure 33:
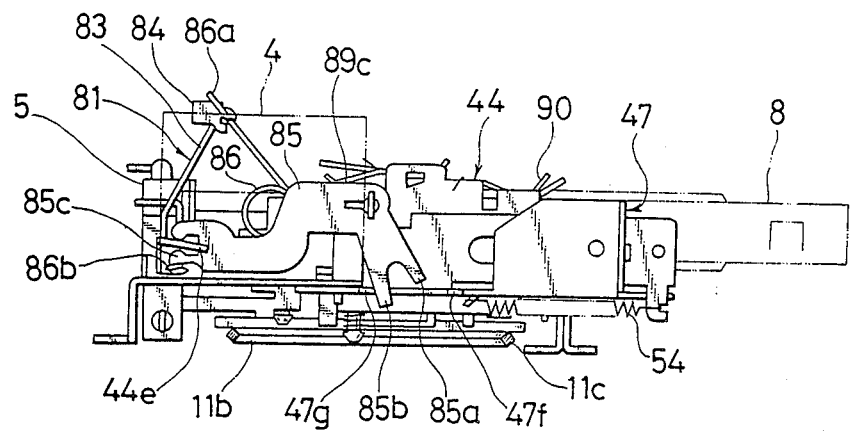
FIG. 33 is a left-hand side elevational view of the cassette tape recorder mechanism of FIG. 1 in a reproducing mode.

The torsion coil spring 86 assumes, when the cassette holder 44 is in its set position, a position in which the one end 86a thereof is positioned at a higher position and the other end 86b thereof is positioned at a lower position as shown in FIG. 33 and acts to press the cassette holder 44 against the chassis 1. However, in this position of the torsion coil spring 86, the force thereof to bias the latching member 81 in the cassette removing direction is very weak or substantially zero. Accordingly, in this position, the contacting force between the latching member 81 and a forward end edge of the cassette holder 44 is so weak that it may little serve as a resistance against the movement of the cassette holder 44 to the set position. To the contrary, as the cassette holder 44 is pivoted from the set position toward the reset position, the other end 86b of the torsion coil spring 86 is lifted as shown in FIG. 6 and thus approaches the one end 86a deforming the torsion coil spring 86 so as to accumulate a spring force in the torsion coil spring 86. As the other end 86b of the torsion coil spring 86 is lifted, it comes to a position forwardly of the one end 86a of the torsion coil spring 86 while gradually increasing the force of the torsion coil spring 86 to bias the latching member 81 to pivot in the cassette removing direction. Finally, when the cassette holder 44 is lifted to the reset position, the forward end edge of the cassette holder 44 is disengaged from the latching piece 82 of the latching member 81 so that the latching member 81 is pivoted strongly in the cassette removing direction by the accumulated spring force of the torsion coil spring 86 until the cassette ejecting piece 83 thereof is engaged with and stopped by an inner end face of the recess 44d of the cassette holder 44. In this position of the latching member 81, the latching piece 82 thereof is located just below the cassette holder 44 so that, when the force to pivot the cassette holder 44 from the set position to reset position is removed subsequently, the latching piece 82 of the latching member 81 is engaged with the lower face of the cassette holder 44 to prevent pivotal motion of the cassette holder 44 toward the set position.

On the contrary, when the cassette holder 44 is arrested at the reset position as shown in FIG. 6, the one end 86a of the torsion coil spring 86 is positioned rightwardly relative to the other end 86b in FIG. 6, and accordingly the force of the torsion coil spring 86 to bias the cassette holder 44 toward the set position is very weak. Consequently, the contacting force between the upper end of the latching piece 82 of the latching member 81 and the lower face of the cassette holder 44 is so weak that it will little serve as a resistance against a tape cassette 8 when the tape cassette 8 is inserted into the cassette holder 44. Thus, if the tape cassette 8 is inserted into the cassette holder 44 and pivots the latching member 81 in the cassette inserting direction, the one end 86a of the coil spring 86 is moved leftwardly in FIG. 6 while gradually increasing a spring force accumulated in the torsion coil spring 86. In this instance, as the one end 86a of the torsion coil spring 86 is moved leftwardly in FIG. 6, it will come to a position higher than the other end 86b of the torsion coil spring 86 while gradually increasing the force to bias the cassette holder 44 toward the set position. Accordingly, when the tape cassette 8 is fully inserted to a position at which it contacts with a stopping wall 44f of the cassette holder 44, the upper end of the latching piece 82 of the latching member 81 is disengaged from the lower face of the cassette holder 44 so that the cassette holder 44 is pivoted strongly toward the set position by the accumulated spring force of the torsion coil spring 86 until the tape cassette 8 is brought into its loaded position as shown in FIG. 33.

Figure 28:
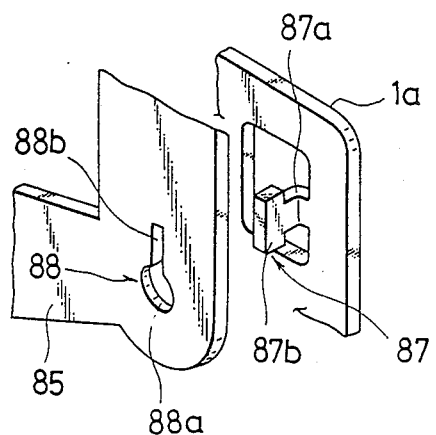
FIG. 28 is a fragmentary perspective view showing the interlocking member of FIG. 27 to be pivotally mounted on a cassette holder.
Figure 29:
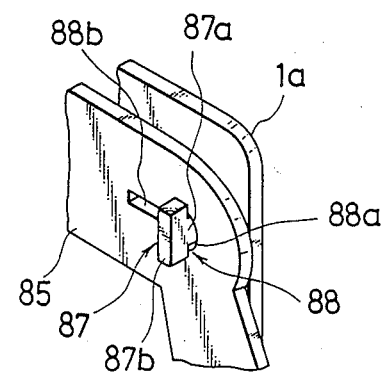
FIG. 29 is a perspective view showing the interlocking member pivotally mounted on the cassette holder of FIG. 28.

A mechanism for mounting the interlocking member 85 on the chassis 1 is particularly shown in FIGS. 28 and 29. In particular, the chassis 1 has a bent lug or projection 87 formed on the side wall 1a thereof while the interlocking member 85 has an engaging hole 88 formed therein in which the projection 87 of the chassis 1 is removably engaged so as to allow pivotal motion of the interlocking member 85 around the projection 87. The projection 87 of the chassis 1 has a body portion 87a, and a head portion 87b of a greater width at an end of the body portion 87a. Meanwhile, the engaging hole 88 of the interlocking member 85 has a rounded hole portion 88a for fitting engagement with the body portion 87a of the projection 87, and a slit portion 88b having one end closed and the other end opened to part of a circumferential edge of the rounded hole portion 88a and having a size or width sufficient to allow the head portion 87b of the projection 87 to pass therethrough. At a particular position of the interlocking member 85 relative to the cassette holder 44 outside an angular range of pivotal motion between them upon normal operation, the head portion 87b of the projection 87 and the slit portion 88b of the engaging hole 88 of the interlocking member 85 are aligned with each other as seen in FIG. 28 so that the projection 87 can be pulled off the engaging hole 88 through the slit portion 88b of the engaging hole 88. To the contrary, when the interlocking member 85 and the cassette holder 44 are relatively positioned within the angular range of pivotal motion thereof, the head portion 87b of the projection 87 prevents the projection 87 from being pulled off the engaging hole 88 as seen in FIG. 29. Since the interlocking member 85 is pivotally mounted on the one side wall 1a of the chassis 1 by means of such a pivotally mounting mechanism as described above, the interlocking member 85 can be assembled to the one side wall 1a of the chassis 1 by a simple operation. Accordingly, the operability in assembly can be improved, and a snap ring such as an E-snap ring for retaining a part can be eliminated, which allows reduction in number of parts for the pivotally mounting mechanism.

Referring to FIGS. 1 to 6 and 30, a cassette holding member 89 is located on the cassette holder 44. The cassette holding member 89 is formed from an elongated plate and has a pair of laterally extending tabs formed on opposite ends thereof and received in a pair of sectoral openings formed in the opposite side walls 44b, 44c of the cassette holder 44 so as to allow pivotal motion of the cassette holding member 89 within a predetermined angular range. A cassette holding leaf spring 90 is secured at one end thereof to a location between a substantially central portion and one end or right-hand side end in FIG. 1 of the cassette holding member 89 and extends at the other end thereof in the cassette removing direction. The cassette holding leaf spring 90 is bent into a substantially V-shape in side elevation at a portion adjacent the other end thereof, and a lower face of a bent corner 90a of the cassette holding leaf spring 90 is located for engagement with an upper face of a tape cassette 8. A torsion coil spring 91 is located adjacent the other end or left-hand side end in FIG. 1 of the cassette holding member 89. The torsion coil spring 91 normally biases the cassette holding member 89 is a counterclockwise direction in FIG. 6 to move the cassette holding leaf spring 90 away from the upper face of the tape cassette 8 and has another function to bias the cassette holding member 89 toward the one end of the latter to absorb a play of the latter in its axial direction. A coil portion 91a of the torsion coil spring 91 is fitted around one of the tabs adjacent the other end of the cassette holding member 89 and opposite ends 91b, 91c of the torsion coil spring 91 are anchored respectively at the cassette holding member 89 and an upper end of the side wall 44b of the cassette holder 44.

An abutting tab 89b is formed on the cassette holding member 89 adjacent the other end of the latter for engaging with a stopping face 44g at an upper end of the side wall 44b of the cassette holder 44. The abutting tab 89b of the cassette holding member 89 contacted with the stopping face 44g of the side wall 44b defines a limit position of the cassette holding member 89 for pivotal motion in the counterclockwise direction in FIG. 6 by the biasing force of the torsion coil spring 91.

Figure 30:
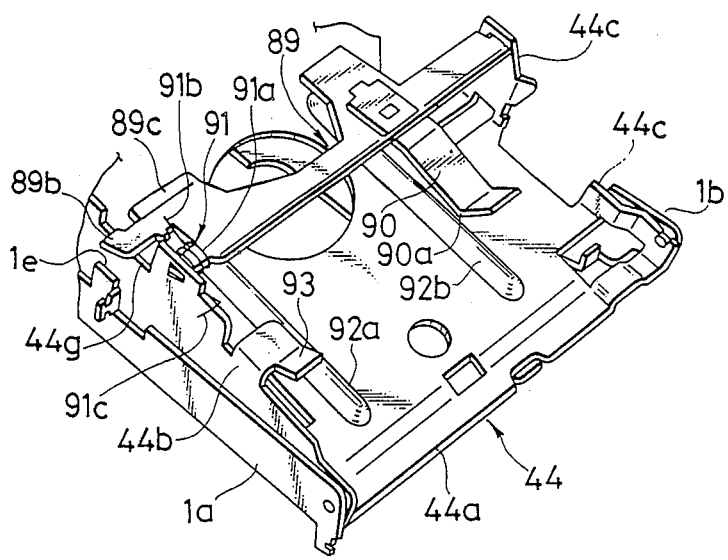
FIG. 30 is a perspective view, partially omitted, of the cassette holder of FIG. 28.

An abutting projection 1e is formed at an upper end of the side wall 1a of the chassis 1 as shown in FIG. 30 such that it may be engaged by the abutting tab 89b of the cassette holding member 89 when the cassette holder 44 is pivoted to the set position. The abutting projection 1e has a function to abut with the abutting tab 89b of the cassette holding member 89 to pivot the cassette holding member 89 against the biasing force of the torsion coil spring 91 so that the cassette holding leaf spring 90 may press the tape cassette 8 against the bottom wall 44a of the cassette holder 44 toward the chassis 1. The cassette holding member 89 has a pressing portion 89c of a substantially V-shape in side elevation formed adjacent the other end thereof for pressing against a tape cassette 8. The pressing portion 89c presses at a lower face thereof against a portion of an upper face of a tape cassette 8 remote from the capstan shaft fitting holes 8a.

Figure 31:
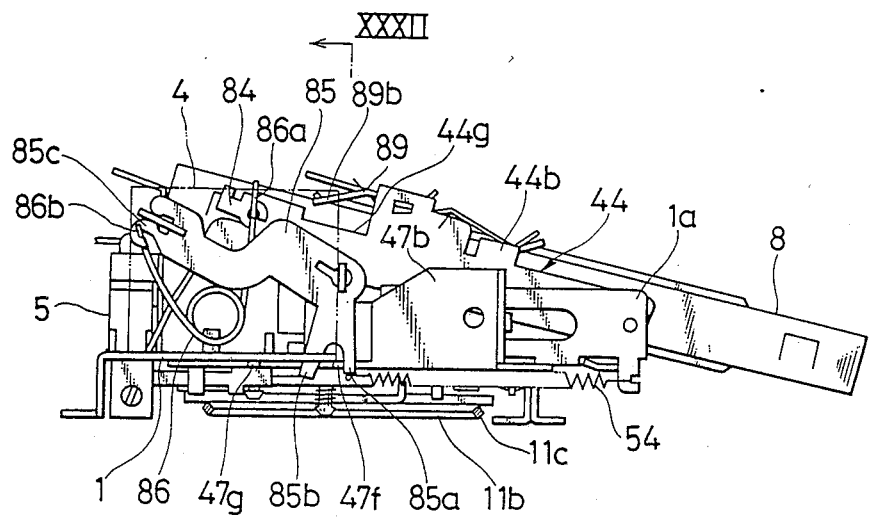
FIG. 31 is a side elevational view showing a tape cassette mounted in position on the cassette holder of FIG. 30 in a reset position.

Since a portion of an upper face of a tape cassette 8 remote from the capstan shaft fitting holes 8a is pressed by the pressing portion 89c of the cassette holding member 89 in this manner, when the cassette holder 44 is pivoted to the reset position, the tape cassette 8 inserted in the cassette holder 44 assumes a slightly inclined position in which a side thereof adjacent the capstan shaft 2 is positioned at a higher position and the other side thereof remote from the capstan shaft 2 is positioned at a lower position as seen in FIG. 31. Accordingly, the tape cassette 8 can be removed without being caught by an upper end of the capstan shaft 2.

Meanwhile, when the tape cassette 8 is inserted into the cassette holder 44 in the reset position, the pressing portion 89c of the cassette holding member 89 is slidably engaged with the upper face of the tape cassette 8 so that the cassette holding member 89 is pivoted by the latter by a small angle in the clockwise direction in FIG. 6 against the biasing force of torsion coil spring 91 to a position in which the abutting tab 89b of the cassette holding member 89 is spaced by a little distance above the stopping face 44g of the cassette holder 44.

Referring to FIG. 30, a pair of guide ribs 92a, 92b are formed in parallel relationship to a direction of the cassette inserting axial line on an upper face of the bottom wall 44a of the cassette holder 44 for controlling the position of the tape cassette 8 in leftward and rightward directions. A cassette holding bent lug 93 of a V-shaped side elevation is formed at an upper end of the side wall 44b of the cassette holder 44.

Now, operation of the automatic stopping device for a tape feeding apparatus according to the present invention having such a construction as described above will be described. In FIGS. 1 to 6, the tape feeding device is shown in its rest mode condition. In this condition, the cassette holder 44 is in its reset position, the stopping operating member 47 is in its rest mode position, and the head mounting plate 22 is held at its rest mode position in which the pinch roller 24 thereon is spaced farthest away from the capstan shaft 2 against the biasing force of the coil spring 46 and the engaging lug 22d thereof engages with the guide face 47d of the stopping operating member 47. Meanwhile, the pivotal member 15 is in its inoperative position or limit position of pivotal motion in the counterclockwise direction in FIG. 2 in which the switch operating arm 15a thereof presses against the tongue 5f of the switch 5 to hold the switch 5 to an off or motor deenergizing position as shown in solid lines in FIG. 7.

In this condition, if a tape cassette 8 is inserted into the cassette holder 44 as shown in FIG. 31 and then further pushed in strongly, the latching piece 82 of the latching member 81 is disengaged from the lower face of the cassette holder 44 to allow the cassette holder 44 to be pivoted to the set position in which the capstan shaft 2 and the reel shaft 3 are fitted in corresponding ones of the capstan shaft fitting holes 8a and the reel shaft fitting holes 8c of the tape cassette 8, respectively. Meanwhile, as the cassette holder 44 is pivoted to the set position, the interlocking member 85 is pivoted in the counterclockwise direction in FIG. 6 whereupon the engagement between the first engaging finger 85a thereof and the first engaging tab 47f of the stopping operating member 47 is canceled to allow the stopping operating member 47 to be moved to the operation mode position by the biasing force of the coil spring 54. Upon such movement of the stopping operating member 47, the second engaging tab 47g thereof is pressed against the second engaging portion 85b of the interlocking member 85 by the restoring force of the coil spring 54 to bias the cassette holder 44 to pivot toward the chassis 1 via the interlocking member 85. Further, upon the movement of the stopping operating member 47 to the operative mode position, the pivotal member 15 is released from the arrested condition by the pressing lug 47e of the stopping operating member 47 in which the pivotal member 15 causes the switch 5 to assume the motor deenergizing position so that the pivotal member 15 is allowed to be pivoted in the clockwise direction in FIG. 2 by the biasing force of the torsion coil spring 17. Consequently, the turning force transmitting member 14 is brought into meshing engagement with the first small diameter gear 13 of the reel shaft 3 while the switch operating arm 15a of the pivotal member 15 is spaced away from the tongue 5f of the switch 5 to allow the switch 5 to be turned on as shown in two dot chain lines in FIG. 7. Consequently, the motor 4 is energized and thus driven to rotate in the clockwise direction in FIG. 2.

Figure 34:
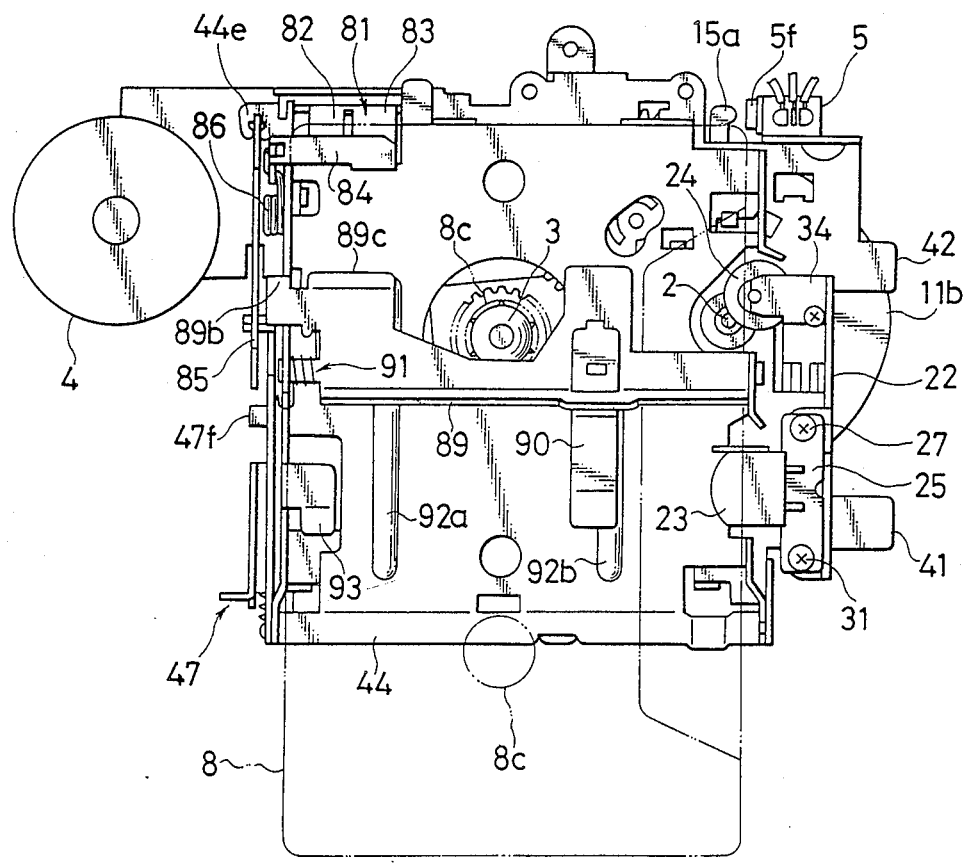
FIG. 34 is a top plan view of the cassette tape recorder mechanism of FIG. 1 in the reproducing mode.

Further, as the stopping operating member 47 is moved to its operative mode position, the head mounting plate 22 is released from its arrested condition at the rest mode position by the stopping operating member 47 so that it is moved in the leftward direction in FIG. 2 by the biasing force of the coil spring 46 to its operative mode position, that is, its reproduction mode position in which the magnetic head 23 contacts with a tape 8b within the tape cassette 8 and the pinch roller 24 is pressed against the capstan shaft 2 via the tape 8b as seen in FIG. 19. Since the turning power of the motor 4 is transmitted to the capstan shaft 2 via the power transmitting mechanism 11, the capstan shaft 2 is rotated in the clockwise direction in FIG. 2. The turning power of the motor 4 is also transmitted to the reel shaft 3 via the power transmitting mechanism 11, second small diameter gear 16, turning force transmitting member 14 and first small diameter gear 13 to rotate the reel shaft 3 in the clockwise direction in FIG. 2. Accordingly, the tape 8b of the tape cassette 8 is fed in a direction indicated by an arrow mark in FIG. 19 in order to effect operation for the reproduction mode in such a condition of the tape feeding apparatus as shown in FIGS. 33 to 35 and as shown in solid lines in FIG. 36.

Figure 38:
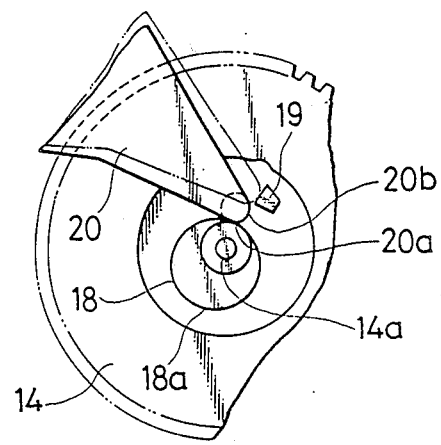
FIG. 38 is an enlarged view showing a turning force transmitting member and a cam follower of the cassette tape recorder mechanism in the position shown in FIG. 37.

In the reproduction condition described above, the cam follower 20 is normally urged in the clockwise direction in FIG. 2 by a turning force of the reel shaft 3 in the clockwise direction in FIG. 2 via the second frictional coupling means 21. Consequently, the cam follower 20 normally assumes a position in which the cam engaging portion 20a thereof is held in sliding contact with the cam face 18a of the circular cam 18 as particularly shown in solid lines in FIG. 38 so that the cam follower 20 is repetitively rocked in the clockwise and counterclockwise directions around the reel shaft 3.

Operation of the reproduction mode is effected in this manner. Then, if the tape 8b is completely wound up from one of a pair of reels not shown within the tape cassette 8 which is not fitted on the reel shaft 3 to the other reel fitted on the reel shaft 3, the reel shaft 3 is stopped while the first small diameter gear 13 continues its rotation, yielding a slip at the first frictional coupling means 12 between the reel shaft 3 and the first small diameter gear 13. As a result of stopping of rotation of the reel shaft 3, the urging force to pivot the cam follower 20 in the clockwise direction in FIG. 2 disappears. Consequently, after the cam follower 20 is pivoted by a maximum angle in the clockwise direction in FIG. 2 by a maximum diameter portion of the cam face 18a of the circular cam 18, the cam follower 20 will not be pivoted back in the clockwise direction in FIG. 2 but stay on a locus of the operating projection 19 on the turning force transmitting member 14. Thus, the second frictional coupling means 21, the cam follower 20 and the circular cam 18 on the turning force transmitting member 14 constitute a detecting means for detecting stopping of rotation of the reel shaft 3. Accordingly, as the turning force transmitting member 14 is rotated further, the engaging projection 20b of the cam follower 20 is soon contacted with the operating projection 19 as shown in two dot chain lines in FIG. 38 and stops rotation of the turning force transmitting member 14 in the counterclockwise direction in FIG. 2. However, since the turning force transmitting member 14 tends to continue its rotation due to the turning power of the motor 4, the pivotal member 15 is after all pivoted in the counterclockwise direction in FIG. 2 around the capstan shaft 2 against the biasing force of the torsion coil spring 17 to move the turning force transmitting member 14 away from the gear 13 of the reel shaft 3, thereby interrupting transmission of the power between the reel shaft 3 and the motor 4. Meanwhile, as the pivotal member 15 is pivoted in the counterclockwise direction in FIG. 2, the switch operating arm 15a thereof presses against the tongue 5f of the switch 5 to turn the switch 5 off as shown in two dot chain lines in FIG. 7. Consequently, energization of the motor 4 is stopped to stop rotation of the capstan shaft 2. Further, at a final stage of the pivotal motion of the pivotal member 15 in the counterclockwise direction in FIG. 2, it is arrested at the pivoted position by the arresting member 70 as shown in two dot chain lines in FIG. 36.

In this condition, if the stopping operating member 47 is pushed in in the downward direction in FIG. 36 to its rest mode position against the biasing force of the coil spring 54 in order to remove the tape cassette 8 from the cassette holder 44, the engaging lug 22d of the head mounting plate 22 is pressed by the guide face 47d of the stopping operating member 47 so that the head mounting plate 22 is moved in the rightward direction in FIG. 36 against the biasing force of the coil spring 46 until the pinch roller 24 comes to its rest mode position in which it is spaced farthest away from the capstan shaft 2 and the pinch roller 24 and the magnetic head 23 are spaced away from the tape cassette 8. Meanwhile, as the stopping operating member 47 is moved to its rest mode position, the pressing lug 47e thereof presses against the engaging arm 15b of the pivotal member 15 and the extension 72b of the torsion coil spring 72 until the engaging projection 15c of the pivotal member 15 advances into the return path portion 76 of the cam groove 73 of the arresting member 70 to allow the arresting member 70 to be pivoted in the direction of the arrow mark d9 in FIG. 22 by the biasing force of the coil spring 72. In this manner, the stopping operating member 47 cancels the arrested condition of the pivotal member 15 by the arresting member 70 and in turn arrests the pivotal member 15 at its pivoted inoperative position in which the pivotal member 15 causes the switch 5 to assume the motor deenergizing position. Further, as the stopping operating member 47 is pivoted to the rest mode position, the first engaging tab 47f thereof presses against the second engaging finger 85b of the interlocking member 85 to pivot the interlocking member 85 in the clockwise direction in FIG. 33 whereupon the cassette holder 44 is also pivoted to its reset position. Upon such pivotal motion of the cassette holder 44, the tape cassette 8 is pushed outwardly of the cassette holder 44 by the cassette ejecting piece 83 of the latching member 81 while the latching piece 82 of the latching member 81 is engaged with the lower face of the cassette holder 44 to arrest the cassette holder 44 to its reset position. Further, in this condition, the first engaging tab 47f of the stopping operation member 47 is engaged with the first engaging finger 85a of the interlocking member 85 so that the stopping operating member 47 is held at the ejecting position against the biasing force of the coil spring 54 as shown in FIG. 6.

While the preferred form of the present invention has been described, it is to be understood that many modifications and variations of the present invention are possible in the light of the above teachings. Here, exemplary modified forms of a mechanism for arresting a pivotal member having a turning force transmitting member supported thereon at a pivoted position will be specifically described.

Figure 39:
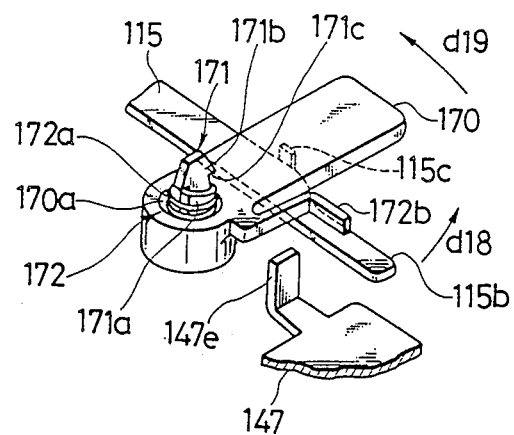
FIG. 39 is a perspective view showing a modified form of arresting member.

Referring first to FIG. 39, a modification to the arresting member 70 of the embodiment described above is shown. A modified arresting member 170 is similar in construction to the arresting member 70 except that it has no such a formation as the arresting groove 70b of the arresting member 70 but has an angularly bent L-shaped elastic finger 172b formed thereon. The finger 170b is located for engagement by a bent pressing lug 147e of a stopping operating member 147. Meanwhile, a coil spring 172 fitted in a fitting hole 170a of the arresting member 170 for biasing the arresting member 170 toward a chassis not shown has no such an extension as the extension 72b of the coil spring 72 of the embodiment described above. The coil spring 172 is interposed in a compressed condition between a spring seat not shown on an end face of the fitting hole 170a of the arresting member 170 and a step 171c between a body portion 171a and a head portion 171b of an arresting projection 171 formed on and extending downwardly from the chassis. An end portion of the coil spring 172 adjacent the step 171c of the arresting projection 171 has a smaller inner diameter than the remaining portion of the coil spring 171 similarly as in the coil spring 72.

Thus, the elastic finger 172b of the arresting member 170 serves as an equivalent to the extension 72b of the coil spring 72. Accordingly, as the stopping operating member 147 moves from its operative mode position to its ejecting position to pivot a pivotal member 115 in a direction indicated by an arrow mark d18 either from an inoperative home position or from a pivoted inoperative position arrested by the arresting member 170 to another pivoted inoperative position through engagement of the pressing lug 147e thereof with an engaging arm 115b of the pivotal member 115, the pressing lug 147e is also engaged with the elastic finger 172b of the arresting member 170 so that the arresting member 170 is biased to pivot in a direction indicated by an arrow mark d19. Consequently, an arrested condition of the pivotal member 115 at the pivoted position by the arresting member 170 through engagement of a cam groove not shown of the former with an engaging projection 115c of the latter is canceled, and the pivotal member 115 is thereafter arrested at the pivoted position by the pressing lug 147e of the stopping operating member 147.

Figure 40:
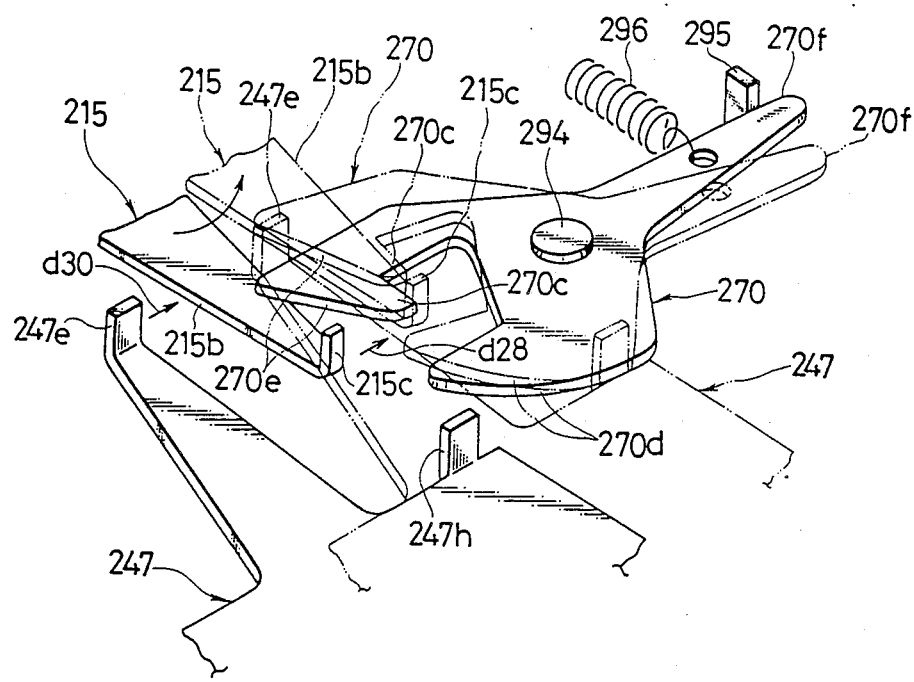
FIG. 40 is a perspective view showing another modified form of arresting member.

Referring now to FIG. 40, another modification is shown. A modified arresting member 270 shown has a substantially Y-shape in plan and is supported at a substantially central portion thereof for pivotal motion on a chassis not shown similar to the chassis 1 of the embodiment described above by means of a shaft 294. The arresting member 270 has an arresting hook 270c extending laterally from an end of one of three arms thereof. The arresting hook 270c of the arresting member 270 has a cam face 270e at an outer side thereof remote from the shaft 294 while a second one of the three arms of the arresting member 270 has a circular or curved cam face 270d also at an outer side thereof. The cam face 270e is located in an opposing relationship to a bent lug or engaging projection 251c on an extension 215b of a pivotal member 215 on which a turning force transmitting member not shown is supported for rotation while the cam face 270d is located in an opposing relationship to another bent lug or engaging projection 247h of a stopping operating member 247. The arresting member 270 further has an abutting portion 270f at one side of the third arm thereof, and the abutting portion 270f is located in an opposing relationship to a stop or bent lug 295 formed on the chassis. The arresting member 270 is normally biased in one direction, that is, in a counterclockwise direction in FIG. 40 by a coil spring 296 and normally engaged at the abutting portion 270f of the third arm thereof with the stop 295. The stop 295 thus defines a limit position of pivotal motion of the arresting member 270 in the one direction or counterclockwise direction in FIG. 40.

When the pivotal member 215 is pivoted in a direction indicated by an arrow mark d28 in FIG. 40 from an operative home position shown in solid lines in FIG. 40, the engaging projection 215c thereof is engaged with the cam face 270e of the arresting member 270 to pivot the arresting member 270 in the clockwise direction in FIG. 40 against the biasing force of the coil spring 296. Then, just after the engaging projection 215c of the pivotal member 215 passes an end of the cam face 270e of the arresting member 270, the arresting member 270 is pivoted back in the counterclockwise direction in FIG. 40 by the biasing force of the coil spring 296 to the operative home position shown in solid lines in FIG. 40. Consequently, when the pivotal member 215 is allowed to pivot back in a direction opposite to the direction of the arrow mark d28, the arresting projection 215c thereof is engaged with an inner face of the arresting hook 270c of the arresting member 270 to thereafter arrest the pivotal member 215 at its pivoted inoperative position shown in two dot chain lines in FIG. 40 in which the pivotal member 215 causes a switch not shown for controlling a motor not shown to assume its motor deenergizing position.

In this condition, if the stopping operating member 247 is pushed to move from an operative mode position shown in sold lines in FIG. 40 in a direction indicated by an arrow mark d30 in FIG. 40 to an ejecting position shown in two dot chain lines in FIG. 40, another bent lug or pressing piece 247e thereof is engaged with the extension 215b of the pivotal member 215 to thereafter arrest the pivotal member 215 at the pivoted inoperative position in which the pivotal member 215 causes the switch to assume its motor deenergizing position. Meanwhile, the engaging projection 247h of the stopping operating member 247 is engaged with the cam face 270d of the second arm of the arresting member 270 to pivot the arresting member 270 in the clockwise direction in FIG. 40 against the biasing force of the coil spring 296 to a position shown in two dot chain lines in FIG. 40 in which the arresting projection 215c of the pivotal member 215 is released from the arresting hook 270c of the arresting member 270. Thus, the arrested condition by the arresting member 270 of the pivotal member 215 at the pivoted inoperative position in which the pivotal member 215 causes the switch to assume its motor deenergizing position is canceled.

Figure 41:
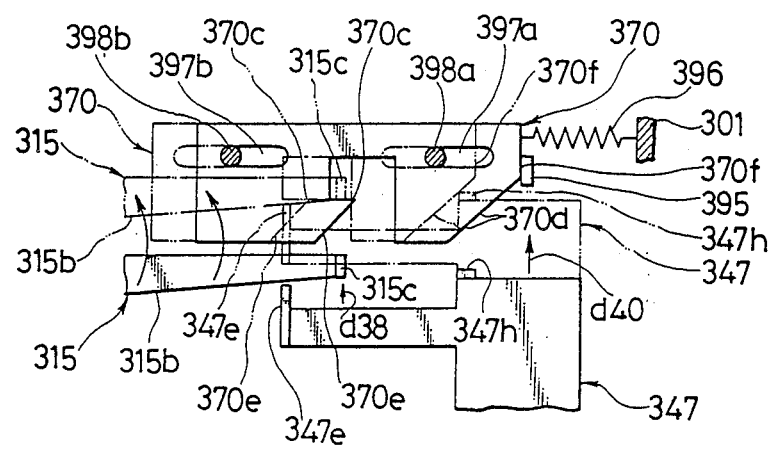
FIG. 41 is a plan view showing a further modified form of arresting member.

Referring now to FIG. 41, a further modification is shown. An arresting member 370 shown has a flattened U-shape in plan and is mounted on a chassis 301 for movement within a range of a longitudinal length of a pair of elongated holes 397a, 397b formed in the arresting member 370 and fitted on a pair of engaging pins 398a, 398b, respectively, secured to the chassis 301. The arresting member 370 has an arresting hook 370c extending laterally from an end of one of a pair of arms thereof. The arresting hook 370c of the arresting member 370 has an inclined cam face 370e at an outer side thereof while the other arm of the arresting member 370 has another inclined cam face 370d at an outer side thereof. The cam face 370e is located in an opposing relationship to a bent lug or engaging projection 315c on an extension 315b of a pivotal member 315 corresponding to the pivotal member 15 of the embodiment described above while the cam face 370d is located in an opposing relationship to a bent lug or engaging projection 347h of a stopping operating member 347. The arresting member 370 further has an abutting portion 370f at one side of the second arm thereof adjacent the cam face 370d, and the abutting portion 370f is located in an opposing relationship to a stop or bent lug 395 formed on the chassis 301. The arresting member 370 is normally biased in one direction, that is, in a rightward direction in FIG. 41 by a coil spring 396 extending between the arresting member 370 and the chassis 301 and is normally engaged at the abutting portion 370f of the second arm thereof with the stop 395. The stop 395 thus defines a limit position of rightward movement of the arresting member 370 in the one direction or rightward direction in FIG. 41.

When the pivotal member 315 is pivoted in a direction indicated by an arrow mark d38 in FIG. 41 from an operative home position shown in solid lines in FIG. 41, the engaging projection 315c thereof is engaged with the cam face 370e of the arresting member 370 to move the arresting member 370 in the leftward direction in FIG. 41 against the biasing force of the coil spring 396. Then, just after the engaging projection 315c of the pivotal member 315 passes an end of the cam face 370e of the arresting member 370, the arresting member 370 is moved back in the rightward direction in FIG. 41 by the biasing force of the coil spring 396 to the home position shown in solid lines in FIG. 41. Consequently, when the pivotal member 315 is allowed to pivot back in a direction opposite to the direction of the arrow mark d38, the arresting projection 315c thereof is engaged with an inner face of the arresting hook 370c of the arresting member 370 to thereafter arrest the pivotal member 315 at its pivoted inoperative position shown in two dot chain lines in FIG. 41 in which the pivotal member 315 causes a switch not shown for controlling a motor not shown to assume its motor deenergizing position.

In this condition, if the stopping operating member 347 is pushed to move from an operative mode position shown in sold lines in FIG. 41 in a direction indicated by an arrow mark d40 in FIG. 41 to an ejecting position shown in two dot chain lines in FIG. 41, another bent lug or pressing piece 347e thereof is engaged with the extension 315b of the pivotal member 315 to thereafter arrest the pivotal member 315 at the pivoted inoperative position in which the pivotal member 315 causes the switch to assume its motor deenergizing position. Meanwhile, the engaging projection 347h of the stopping operating member 347 is engaged with the cam face 370d of the second arm of the arresting member 370 to move the arresting member 370 again in the leftward direction in FIG. 41 against the biasing force of the coil spring 396 to a position shown in two dot chain lines in FIG. 41 in which the arresting projection 315c of the pivotal member 315 is released from the arresting hook 370c of the arresting member 370. Thus, the arrested condition by the arresting member 370 of the pivotal member 315 at the pivoted inoperative position in which the pivotal member 315 causes the switch to assume its motor deenergizing position is canceled.

While the modified forms of a mechanism for arresting a pivotal member having a turning force transmitting member supported thereon at a pivoted position has been described, variations and modifications to the automatic stopping device of the embodiment described above are also possible. For example, while in the embodiment described above the cam face 18a of the circular cam 18 is provided by an outer periphery of the cam 18, it may otherwise be provided by an inner periphery of the cam 18. Further, while the head mounting plate 22 is constituted as a movable member, the stopping operating member 47 may be formed as a movable member on the contrary. In addition, while the cam engaging portion 20a and the engaging projection 20b are provided on a common member, that is, on the cam follower 20 in the embodiment described above, they may otherwise be provided on separate elements.

What is claimed is:

1. An automatic stopping device for a tape feeding apparatus which includes a capstan shaft, a reel shaft, a motor for normally rotating said capstan shaft and said reel shaft, and a switch for interrupting energization of said motor to stop rotation of said capstan shaft and said reel shaft, comprising a turning force transmitting member connected to said motor via said capstan shaft, a pivotal member supporting said turning force transmitting member for rotation thereon and mounted for pivotal motion between an operative position in which transmission of a turning force from said turning force transmitting member to said reel shaft is enabled and an inoperative position in which transmission of a turning force is disabled, said switch being located for operation by said pivotal member so as to deenergize said motor in response to the inoperative position of said pivotal member, means for biasing said pivotal member toward the operative position, frictional coupling means interposed between said turning force transmitting member and said reel shaft, detecting means for detecting stopping of rotation of said reel shaft, operating means on said turning force transmitting member operable when said detecting means detects stopping of rotation of said reel shaft for cooperating with said detecting means to pivot said pivotal member from the operative to the inoperative position, and a movable member mounted for movement between an operative mode position and a rest mode position and operable upon movement thereof from the operative mode position to the rest mode position after stopping of said motor for disabling cooperation between said detecting means and said operating means.

2. An automatic stopping device for a tape feeding apparatus as claimed in claim 1, wherein said movable member is a head mounting plate on which a magnetic head is mounted.

3. An automatic stopping device for a tape feeding apparatus as claimed in claim 1, wherein said movable member is a stopping operating member manually operable for stopping operation of said tape feeding apparatus.

4. An automatic stopping device for a tape feeding apparatus as claimed in claim 1, wherein said detecting means includes a circular cam located for integral rotation on said turning force transmitting member and in an eccentric relationship around an axis of rotation of said turning force transmitting member, a cam follower mounted for limited coaxial rotation relative to said reel shaft, and second frictional coupling means interposed between said reel shaft and said cam follower for frictionally transmitting a turning force of said reel shaft to said cam follower, said movable member having an engaging portion thereon, said cam follower having thereon a first portion for slidably engaging with said circular cam, a second portion for engaging with said operating means, and a third portion for engaging with said engaging portion of said movable member, whereby, when said reel shaft is rotating, said first portion of said cam follower is held in engagement with said circular cam while said second portion of said cam follower is not engaged with said operating means, but when rotation of said reel shaft is stopped, as said turning force transmitting member continues its rotation, said first portion of said cam follower is spaced away from said circular cam, thereby detecting stopping of rotation of said reel shaft.

5. An automatic stopping device for a tape feeding apparatus as claimed in claim 4, wherein said operating means is an operating element located in a spaced relationship from said circular cam on a face of said turning force transmitting member, and said cam follower has a first arm on which said first and second portions are formed in a juxtaposed relationship and a second arm on which said third portion is formed.

6. An automatic stopping device for a tape feeding apparatus as claimed in claim 4, wherein said second friction mechanism is constituted by a substantially C-shaped fitting recess which is formed on said cam follower and has an inner face resiliently fitted around an outer periphery of said reel shaft.

7. An automatic stopping device for a tape feeding apparatus as claimed in claim 4, wherein said third portion of said cam follower is resiliently deformable.

8. An automatic stopping device for a tape feeding apparatus as claimed in claim 1, further comprising first arresting means operable in response to pivotal motion of said pivotal member from the operative to the inoperative position for arresting said pivotal member at the inoperative position, and second arresting means operable in response to movement of said movable member from the operative mode position to the rest mode position for canceling an arrested condition of said pivotal member at the inoperative position by said first arresting means and in turn arresting said pivotal member at the inoperative position.

9. An automatic stopping device for a tape feeding apparatus as claimed in claim 8, wherein said first arresting means includes an arresting member mounted for pivotal motion around a predetermined axis and having a cam groove formed therein, and spring means located for engagement by said movable member, said pivotal member having an engaging projection formed therein for engaging with said cam groove of said arresting member, said spring means being engaged by said movable member to resiliently bias said arresting member only when said movable member is moved from the operative mode position to the rest mode position.

10. An automatic stopping device for a tape feeding apparatus as claimed in claim 9, wherein said spring means is a coil spring having a coiled portion fitted around the predetermined axis of said arresting member and an extension contiguous to an end of said coil portion and located for engagement by said movable member.

11. An automatic stopping device for a tape feeding apparatus as claimed in claim 9, wherein said spring means is a resilient finger formed laterally in an integral relationship on said arresting member and located for engagement by said movable member.

12. An automatic stopping device for a tape feeding apparatus as claimed in claim 8, wherein said first arresting means includes an arresting member mounted for movement from and to a predetermined position and having an arresting portion thereon, and spring means for normally biasing said arresting member toward said predetermined position, said pivotal member having an engaging projection thereon, said arresting member further having a camming portion thereon which is engaged, when said pivotal member is pivoted from the operative to the inoperative position, by said engaging projection of said pivotal member to move said arresting member from the predetermined position against the biasing force of said spring means to allow said engaging projection of said pivotal member to be arrested by said arresting portion of said arresting member to arrest said pivotal member at the inoperative position.

13. An automatic stopping device for a tape feeding apparatus as claimed in claim 12, wherein said arresting member has a second camming portion thereon, and said movable member has a first portion formed thereon and located for engagement with said pivotal member, and a second portion for engagement with said second camming portion of said arresting member to move said arresting member from the predetermined position against the biasing force of said spring means to allow said engaging projection of said pivotal member to be released from said arresting portion of said arresting member.

14. An automatic stopping device for a tape feeding apparatus as claimed in claim 8, wherein said movable member is a stopping operating member manually operable for stopping operation of said tape feeding apparatus.

15. An automatic stopping device for a tape feeding apparatus as claimed in claim 14, wherein said stopping operating member is associated with a cassette holder such that when a tape cassette is inserted to a predetermined position into said cassette holder and said cassette holder is moved to a cassette loading position, said cassette holder is released from said second arresting member and moved from the rest position to the operative mode position and when said stopping operating member is moved from the operative mode position to the rest mode position, said cassette holder is moved from the cassette loading position to a cassette ejecting position to eject the cassette.

16. An automatic stopping device for a tape feeding apparatus as claimed in claim 14, wherein the operative mode position and the rest mode position of said stopping operating member are a recording or reproducing position and an ejecting position, respectively, and said stopping operating member has a fast feeding mode position between the operative mode position and the rest mode position, and further comprising third arresting means for arresting, when said stopping operating member is moved from the operative mode position to the fast feeding mode position, said stopping operating member at the fast feeding mode position.

17. An automatic stopping device for a tape feeding apparatus as claimed in claim 16, wherein said third arresting means includes an arresting member having a cam groove formed therein, and said stopping operating member has an engaging portion formed therein for engagement with said cam groove of said arresting member, said cam groove of said arresting member being formed such that when said stopping operating member is moved from the operative mode position to the rest mode position or reversely from the rest mode position to the operative mode position, said cam groove allows such movement of said stopping operating member, but when said stopping operating member is moved from the operative mode position to the fast feeding mode position, said stopping operating member is arrested at the fast feeding mode position through engagement of said engaging portion of said stopping operating member with said cam groove of said arresting member and then when said stopping operating member is moved from the fast feeding mode position toward the rest mode position, said stopping operating member is released from an arrested condition by said arresting member.

18. An automatic stopping device for a tape feeding apparatus which includes a capstan shaft, a reel shaft, a motor for normally rotating said capstan shaft and said reel shaft, and a switch for interrupting energization of said motor to stop rotation of said capstan shaft and said reel shaft, comprising a pivotal member mounted for pivotal motion around a predetermined axis and spring-biased to a predetermined position, a turning force transmitting member supported for rotation on said pivotal member and connected to be rotated by a turning force of said capstan shaft and transmit, when said pivotal member is in the predetermined position, the turning force of said capstan shaft to said reel shaft via a first friction mechanism, a circular cam located for integral rotation on said turning force transmitting member and in an eccentric relationship around an axis of rotation of said turning force transmitting member, an operating element located on said turning force transmitting member in a spaced relationship from a peripheral face of said circular cam, a cam follower normally urged in one direction by the turning force of said reel shaft transmitted thereto via a second friction mechanism, and a movable member having an operative mode position and a rest mode position and having an engaging portion formed thereon, said cam follower having a first portion for slidably engaging with the peripheral face of said circular cam, a second portion for engaging with said operating element, and a third portion for engaging with said engaging portion of said movable member, whereby, when said reel shaft is rotating, said first portion of said cam follower is held in engagement with the peripheral face of said circular cam while said second portion of said cam follower is not engaged with said operating element, but when rotation of said reel shaft is stopped, said first portion of said cam follower is spaced away from the peripheral face of said circular cam so that said second portion of said cam follower is soon engaged with said operating element to move said pivotal member to operate said switch so as to interrupt energization of said motor while said turning force transmitting member is removed from a turning force transmitting route from said capstan shaft to said reel shaft, and then when said movable member is moved from the operative mode position to the rest mode position after stopping of said motor, said engaging portion of said movable member is engaged with said third portion of said cam follower to move said cam follower back to the position in which said first portion thereof is slidably engaged with the peripheral face of said circular cam and said second portion thereof is not engaged with said operating element.

19. An automatic stopping device for a tape feeding apparatus which includes a capstan shaft, a reel shaft, a motor for normally rotating said capstan shaft and said reel shaft, and a switch for interrupting energization of said motor to stop rotation of said capstan shaft and said reel shaft, comprising a turning force transmitting member which is rotated, during feeding of a tape, by a turning force of said capstan shaft to transmit the turning force to said reel shaft via a friction mechanism, an operating member which operates when rotation of said reel shaft is stopped, a pivotal member on which said turning force transmitting member is supported for rotation and which is pivoted in one direction by the turning force of said turning force transmitting member upon operation of said operating member to change over said switch to interrupt energization of said motor, said pivotal member being normally biased in the other direction, an arresting member which operates upon pivotal motion of said pivotal member in the one direction to arrest said pivotal member at its pivoted position, and a movable member having an operative mode position and a rest mode position and operable upon movement thereof from the operative mode position to the rest mode position to cancel an arrested condition of said pivotal member by said arresting member and in turn arrest said pivotal member at its pivoted position in the one direction.

* * * * *